(12) United States Patent
Paz et al.

(10) Patent No.: US 12,388,589 B2
(45) Date of Patent: Aug. 12, 2025

(54) INTER-SLOT DEMODULATION REFERENCE SIGNAL PATTERNS

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL); Shay Landis, Hod Hasharon (IL); Gideon Shlomo Kutz, Ramat Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 736 days.

(21) Appl. No.: 17/652,856

(22) Filed: Feb. 28, 2022

(65) Prior Publication Data
US 2023/0275715 A1    Aug. 31, 2023

(51) Int. Cl.
*H04L 5/00* (2006.01)
*H04W 72/0446* (2023.01)
*H04W 72/23* (2023.01)

(52) U.S. Cl.
CPC ....... *H04L 5/0048* (2013.01); *H04W 72/0446* (2013.01); *H04W 72/23* (2023.01); *H04L 5/0094* (2013.01)

(58) Field of Classification Search
CPC ... H04L 5/0048; H04L 5/0051; H04L 5/0091; H04L 5/0094; H04L 5/0007; H04W 72/0446; H04W 72/23
See application file for complete search history.

(56) References Cited

U.S. PATENT DOCUMENTS

| | | | |
|---|---|---|---|
| 2018/0091276 A1* | 3/2018 | Huang | H04W 24/02 |
| 2019/0044679 A1* | 2/2019 | Manolakos | H04L 5/0051 |
| 2021/0051052 A1* | 2/2021 | Bhattad | H04L 5/0051 |
| 2023/0103732 A1* | 4/2023 | Hwang | H04W 56/0015 370/330 |
| 2023/0216711 A1* | 7/2023 | Yao | H04L 5/0051 370/328 |
| 2024/0031095 A1* | 1/2024 | Sun | H04L 25/0224 |

* cited by examiner

*Primary Examiner* — Oussama Roudani
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, from a network entity, a demodulation reference signal (DMRS) configuration indicating an intra-slot DMRS pattern. The UE may receive, from the network entity, an indication of an inter-slot DMRS pattern. The UE may communicate, with the network entity, a message that is associated with a time domain resource allocation that includes multiple slots, the message including one or more DMRSs in accordance with the intra-slot DMRS pattern and the inter-slot DMRS pattern. Numerous other aspects are provided.

30 Claims, 11 Drawing Sheets

INTER-SLOT DEMODULATION REFERENCE SIGNAL PATTERNS

FIELD OF THE DISCLOSURE

Aspects of the present disclosure generally relate to wireless communication and specifically, to techniques and apparatuses associated with inter-slot demodulation reference signal (DMRS) patterns.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In higher frequency communication scenarios communications, such as communications using a sub-terahertz (sub-THz) frequency band, may experience relatively high phase noise (for example, compared to communications using a lower frequency), which will require a relatively large subcarrier spacing (SCS). A relatively large SCS may cause symbols to be relatively short in the time domain (for example, based at least in part on SCS and symbol durations being inversely correlated). For example, communications using a sub-THz frequency band may use a numerology with an SCS of 960 kilohertz (KHz). This may result in an approximate slot duration (for example, assuming 14 symbols per slot with a CP) of 15.6 microseconds. Comparatively, for a slot format using a numerology of an SCS of 120 KHz, an approximate slot duration (for example, assuming 14 symbols per slot with a CP) may be 125 microseconds.

The sub-THz frequency band may be associated with relatively static and flat channel assumptions. For example, in the sub-THz frequency band, a user equipment (UE) may have relatively low mobility (for example, because of a line of sight (LOS) requirement between the UE and a network entity). Additionally, the sub-THz frequency band may be associated with a relatively low delay spread and a strong line-of-sight component (for example, due to the relatively narrow beams used in the sub-THz frequency band). Because of the relatively static and flat channel assumptions and the relatively short slot durations and sampling times, the sub-THz frequency band may be associated with channel coherency that spans multiple slots. As used herein, two points in time may be associated with channel coherency if channel conditions at the two points in time are relatively the same (for example, if a first channel condition at a first time is within a threshold amount from a second channel condition at a second time). Compared to lower frequencies, a duration of time that would have otherwise spanned a single slot may span multiple slots in the sub-THz frequency band.

A demodulation reference signal (DMRS) may carry information (for example, information stored by the UE or pilots) used to estimate a radio channel for demodulation of an associated physical channel. The design and mapping of a DMRS may be specific to a physical channel for which the DMRS is used for estimation. A DMRS pattern or sequence may be used in a data transmission to facilitate channel equalization, demodulation, or decoding, among other examples, by a receiving device, such as a UE. In the sub-THz frequency band, the UE and a network entity may communicate using a waveform that includes a time domain phase tracking reference signal (PTRS). The time domain PTRS may enable the UE and the network entity to estimate and mitigate residual frequency offset. This may result in a reduced phase drift or a reduced phase error accumulation over time. Therefore, because the sub-THz frequency band may be associated with channel coherency that spans over multiple slots and because phase noise and frequency offset corrections may be mitigated using measurements of the PTRSs, DMRSs may not be needed in each slot to enable the UE and the network entity to determine a sufficient channel estimation. Therefore, transmitting DMRSs in each slot in such examples may result in the UE and network entity unnecessarily consuming resources (for example, time domain resources, frequency domain resources, or processing resources) associated with communicating (for example, transmitting or receiving) one or more DMRSs or performing channel estimation based at least in part on the one or more DMRSs in each slot (for example, the one or more DMRSs may be communicated in each slot unnecessarily because of an incorrect assumption that the channel is changing from slot to slot or that channel coherency does not span multiple slots).

The high frequencies and large bandwidths used in high frequency bands, such as the sub-THz frequency band, may result in sensitivity to uncompensated sampling time offset (STO). STO may refer to an offset or an error of a time at which a receiver (for example, a device receiving a signal) is to sample the signal. For example, uncompensated STO may result in a receiver, such as the UE, incorrectly determining slot boundaries or symbol boundaries, resulting in inter-symbol interference or degraded performance of communications, among other examples. When the UE and the network entity are communicating using a higher frequency band, such as the sub-THz frequency band, a relatively small uncompensated STO associated with a DMRS received by the receiver may result in a relatively high phase deviation for signals received in slots or symbols following the reception of the DMRS. An expected amount of time drift or STO experienced by the receiver may be based at least in part on an amount of time from receiving a DMRS, a synchronization reference signal periodicity, or a signal-to-noise ratio (SNR) experienced by the receiver, among other examples. If the UE and the network entity were to communicate using a static inter-slot DMRS pattern (for example, associated with DMRSs being transmitted once every N slots, where N does not change over time), then communications between the UE and the network entity may experience time drift or STO caused by synchronization reference signal periodicity or an SNR experienced by the UE changing over time. This may result in degraded communication performance or inter-symbol interference experienced by the UE, among other examples.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to receive, from a network entity, a demodulation reference signal (DMRS) configuration indicating an intra-slot DMRS pattern. The processor-readable code, when executed by the at least one processor, may be configured to cause the UE to receive, from the network entity, an indication of an inter-slot DMRS pattern. The processor-readable code, when executed by the at least one processor, may be configured to cause the UE to communicate, with the network entity, a message that is associated with a time domain resource allocation that includes multiple slots, the message including one or more DMRSs in accordance with the intra-slot DMRS pattern and the inter-slot DMRS pattern.

Some aspects described herein relate to a network entity for wireless communication. The network entity may include at least one processor and at least one memory, communicatively coupled with the at least one processor, that stores processor-readable code. The processor-readable code, when executed by the at least one processor, may be configured to cause the network entity to transmit a DMRS configuration indicating an intra-slot DMRS pattern. The processor-readable code, when executed by the at least one processor, may be configured to cause the network entity to transmit an indication of an inter-slot DMRS pattern. The processor-readable code, when executed by the at least one processor, may be configured to cause the network entity to communicate a message that is associated with a time domain resource allocation that includes multiple slots, the message including one or more DMRSs in accordance with the intra-slot DMRS pattern and the inter-slot DMRS pattern.

Some aspects described herein relate to a method of wireless communication performed by a UE. The method may include receiving, from a network entity, a DMRS configuration indicating an intra-slot DMRS pattern. The method may include receiving, from the network entity, an indication of an inter-slot DMRS pattern. The method may include communicating, with the network entity, a message that is associated with a time domain resource allocation that includes multiple slots, the message including one or more DMRSs in accordance with the intra-slot DMRS pattern and the inter-slot DMRS pattern.

Some aspects described herein relate to a method of wireless communication performed by a network entity. The method may include transmitting a DMRS configuration indicating an intra-slot DMRS pattern. The method may include transmitting an indication of an inter-slot DMRS pattern. The method may include communicating a message that is associated with a time domain resource allocation that includes multiple slots, the message including one or more DMRSs in accordance with the intra-slot DMRS pattern and the inter-slot DMRS pattern.

Some aspects described herein relate to a non-transitory computer-readable medium that stores a set of instructions for wireless communication by a UE. The set of instructions, when executed by one or more processors of the UE, may cause the UE to receive, from a network entity, a DMRS configuration indicating an intra-slot DMRS pattern. The set of instructions, when executed by one or more processors of the UE, may cause the UE to receive, from the network entity, an indication of an inter-slot DMRS pattern. The set of instructions, when executed by one or more processors of the UE, may cause the UE to communicate, with the network entity, a message that is associated with a time domain resource allocation that includes multiple slots, the message including one or more DMRSs in accordance with the intra-slot DMRS pattern and the inter-slot DMRS pattern.

Some aspects described herein relate to a non-transitory computer-readable medium that stores a set of instructions for wireless communication by a network entity. The set of instructions, when executed by one or more processors of the network entity, may cause the network entity to transmit a DMRS configuration indicating an intra-slot DMRS pattern. The set of instructions, when executed by one or more processors of the network entity, may cause the network entity to transmit an indication of an inter-slot DMRS pattern. The set of instructions, when executed by one or more processors of the network entity, may cause the network entity to communicate a message that is associated with a time domain resource allocation that includes multiple slots, the message including one or more DMRSs in accordance with the intra-slot DMRS pattern and the inter-slot DMRS pattern.

Some aspects described herein relate to an apparatus for wireless communication. The apparatus may include means for receiving, from a network entity, a DMRS configuration indicating an intra-slot DMRS pattern. The apparatus may include means for receiving, from the network entity, an indication of an inter-slot DMRS pattern. The apparatus may include means for communicating, with the network entity, a message that is associated with a time domain resource allocation that includes multiple slots, the message including one or more DMRSs in accordance with the intra-slot DMRS pattern and the inter-slot DMRS pattern.

Some aspects described herein relate to an apparatus for wireless communication. The apparatus may include means for transmitting a DMRS configuration indicating an intra-slot DMRS pattern. The apparatus may include means for transmitting an indication of an inter-slot DMRS pattern. The apparatus may include means for communicating a message that is associated with a time domain resource allocation that includes multiple slots, the message including one or more DMRSs in accordance with the intra-slot DMRS pattern and the inter-slot DMRS pattern.

Aspects generally include a method, apparatus, system, computer program product, non-transitory computer-readable medium, user equipment, network entity, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
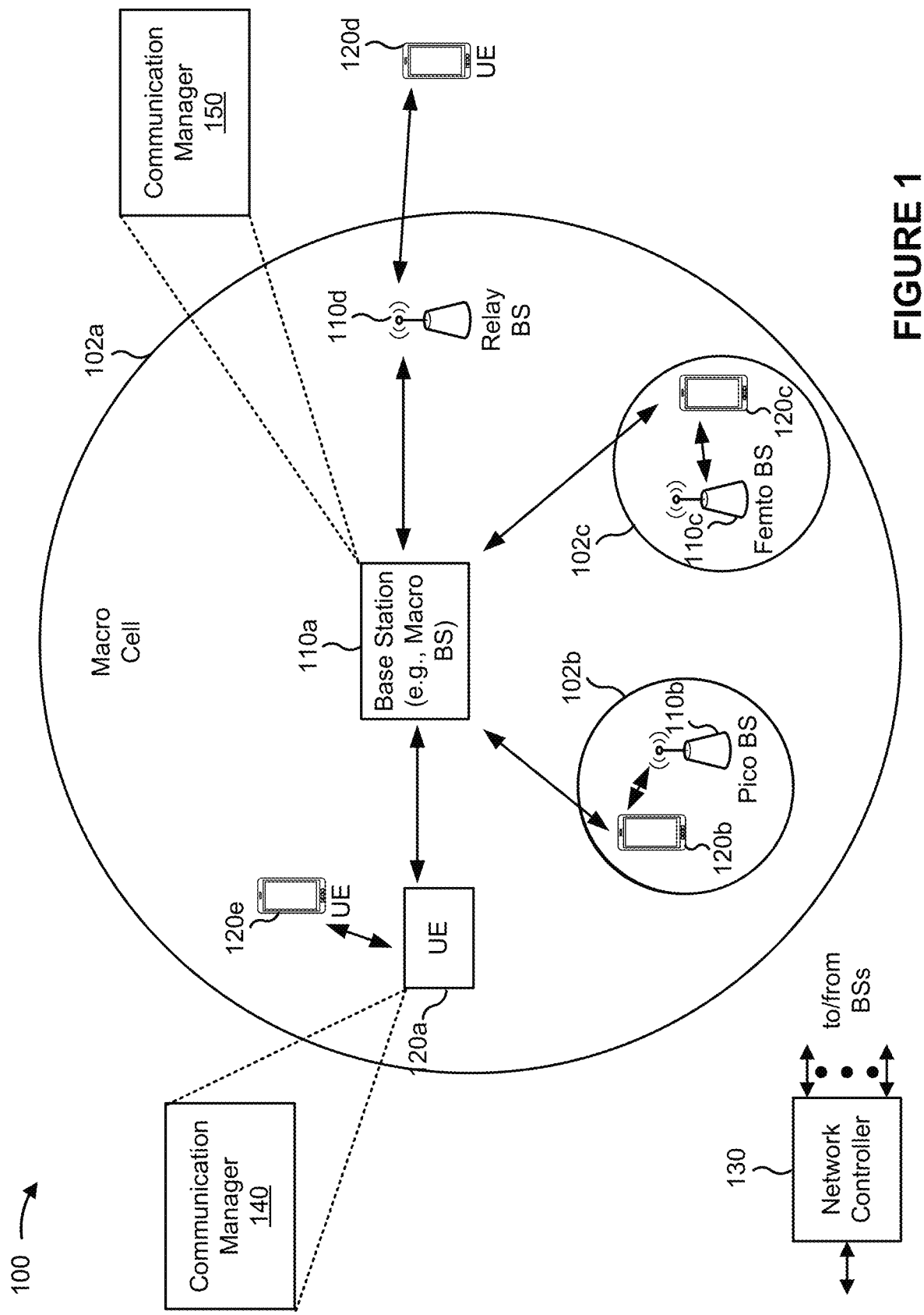
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to inter-slot demodulation reference signal (DMRS) patterns. Some aspects more specifically relate to dynamic or semi-static inter-slot DMRS patterns (for example, for communications using high frequency bands, such as a sub-terahertz (sub-THz) frequency band). In some aspects, a user equipment (UE) may receive, from a network entity, an indication of an inter-slot DMRS pattern. The inter-slot DMRS pattern may indicate a subset of slots, from a set of slots, that include at least one DMRS. For example, higher frequency bands may be associated with data communications that span multiple slots (for example, due to the shortened slot duration and an increased data capacity in the higher frequency bands). The inter-slot DMRS pattern may indicate one or more slots, of the multiple slots, that include at least one DMRS or may indicate one or more slots, of the multiple slots, that do not include any DMRSs.

In some aspects, the UE may receive the indication of the inter-slot DMRS pattern via a radio resource control (RRC) message, a medium access control (MAC) control element (MAC-CE) message, or a downlink control information (DCI) message, among other examples. For example, an RRC message may indicate a set of inter-slot DMRS patterns corresponding to respective time domain resource allocation sizes (for example, in terms of a quantity of slots). As another example, a DCI message may include one or more indications that indicate one or more respective slots, of the multiple slots, that include at least one DMRS of the one or more DMRSs (for example, the DCI message may include a bitmap where each bit in the bitmap corresponds to a respective slot index). As another example, a MAC-CE message may activate an inter-slot DMRS pattern from a set of inter-slot DMRS patterns (for example, from a set of configured or pre-configured inter-slot DMRS patterns).

Particular aspects of the subject matter described in this disclosure can be implemented to realize one or more of the following potential advantages. In some examples, the described techniques can be used to enable DMRSs to be communicated once every N slots, rather than once in each slot. This may reduce a signaling overhead associated with the UE and the network entity communicating DMRSs, thereby increasing an achievable data throughput between the UE and the network entity. For example, allocating 1 DMRS symbol per slot versus 1 DMRS per N slots and assuming K data symbols (for example, associated with a physical downlink shared channel (PDSCH)) per slot results in $$\left(\frac{NK-1}{(N-1)K} - 1\right)$$

factor of throughput increase over the N slots.

Additionally, the described techniques can be used to enable inter-slot DMRS patterns used to communicate DMRSs between the UE and the network entity to be changed over time. For example, the network entity may change the inter-slot DMRS pattern based at least in part on one or more factors, such as a Doppler shift, a signal-to-noise ratio (SNR) value, a synchronization reference signal periodicity, or a scheduling scenario, among other examples. As a result, the inter-slot DMRS pattern may be adapted over time based at least in part on the one or more factors. This may result in improved time tracking or frequency tracking by a receiver, thereby improving communication performance for communications between the UE and the network entity.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a base station (BS) 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some aspects, the term "base station" (for example, the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. In some examples, the higher frequency bands may include a sub-THz frequency band. The sub-THz frequency band may include frequencies include in the FR4a, FR4-1, FR4, FR5, or higher frequencies. For example, the sub-THz frequency band may include frequencies greater than 100 GHz. In some cases, the sub-THz frequency band may include frequencies in the range of 90 GHz-300 GHz.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges. Similarly, the term "sub-THz" may broadly represent frequencies greater than 90 GHz, frequencies less than 1 THz (and greater than 90 GHz), or frequencies in the range of 90 GHz-300 GHz.

In some aspects, the UE 120 may include a communication manager 140. As described in more detail elsewhere herein, the communication manager 140 may receive, from a network entity, a DMRS configuration indicating an intra-slot DMRS pattern; receive, from the network entity, an indication of an inter-slot DMRS pattern; and communicate, with the network entity, a message that is associated with a time domain resource allocation that includes multiple slots, the message including one or more DMRSs in accordance with the intra-slot DMRS pattern and the inter-slot DMRS pattern. Additionally or alternatively, the communication manager 140 may perform one or more other operations described herein.

In some aspects, a network entity, shown as the base station 110 in FIG. 1 as an example, may include a communication manager 150. As described in more detail elsewhere herein, the communication manager 150 may transmit a DMRS configuration indicating an intra-slot DMRS pattern; transmit an indication of an inter-slot DMRS pattern; and communicate a message that is associated with a time domain resource allocation that includes multiple slots, the message including one or more DMRSs in accordance with the intra-slot DMRS pattern and the inter-slot DMRS pattern. Additionally or alternatively, the communication manager 150 may perform one or more other operations described herein.

Figure 2:
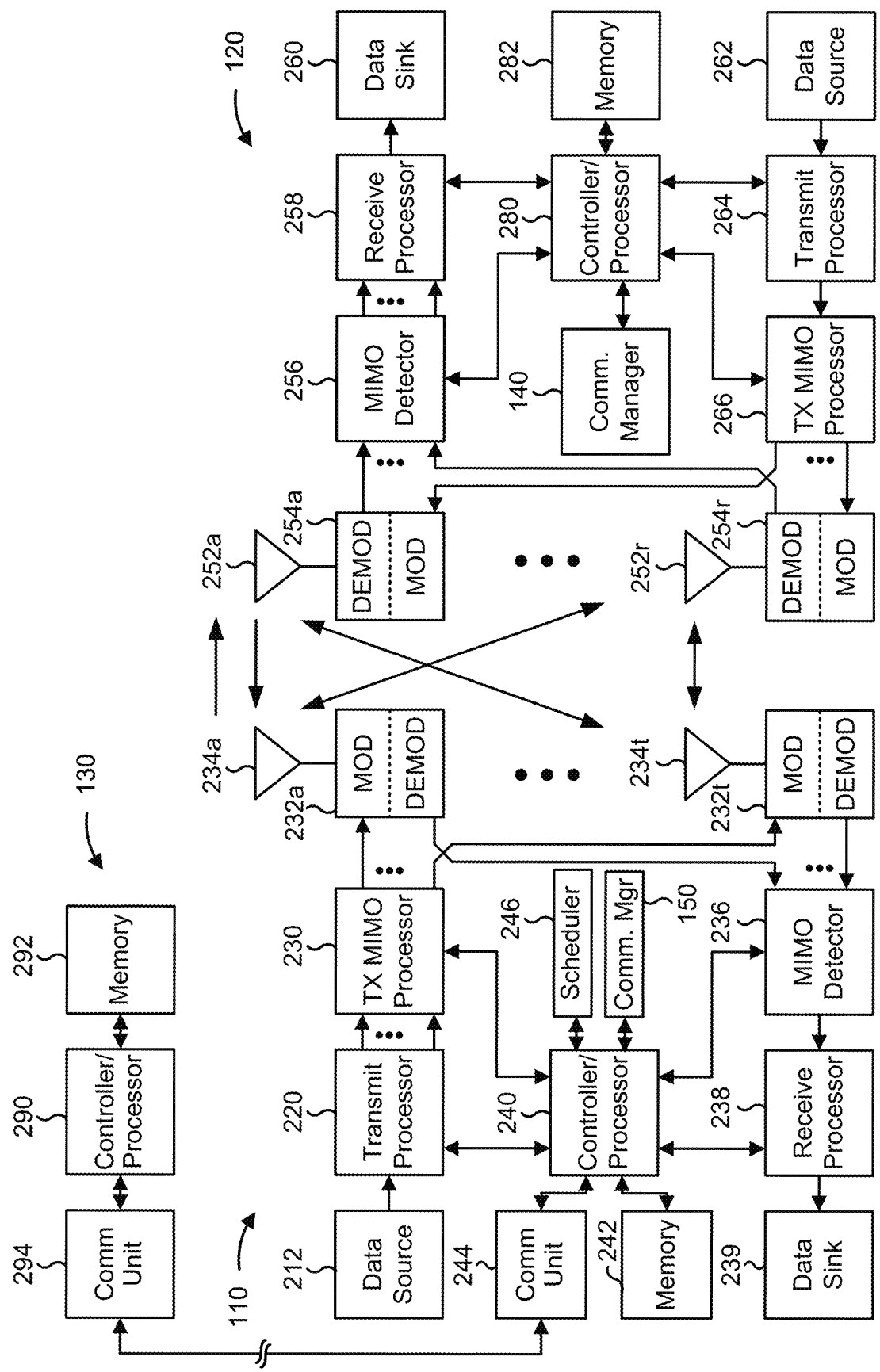
FIG. 2 is a diagram illustrating an example base station in communication with a user equipment (UE) in a wireless network, in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a DMRS) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with inter-slot DMRS patterns, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein, or other processes as described herein. In some examples, executing instructions may include running the instructions, converting the instructions, compiling the instructions, or interpreting the instructions, among other examples.

In some aspects, the UE 120 includes means for receiving, from a network entity, a DMRS configuration indicating an intra-slot DMRS pattern; means for receiving, from the network entity, an indication of an inter-slot DMRS pattern; or means for communicating, with the network entity, a message that is associated with a time domain resource allocation that includes multiple slots, the message including one or more DMRSs in accordance with the intra-slot DMRS pattern and the inter-slot DMRS pattern. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for transmitting a DMRS configuration indicating an intra-slot DMRS pattern; means for transmitting an indication of an inter-slot DMRS pattern; or means for communicating a message that is associated with a time domain resource allocation that includes multiple slots, the message including one or more DMRSs in accordance with the intra-slot DMRS pattern and the inter-slot DMRS pattern. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
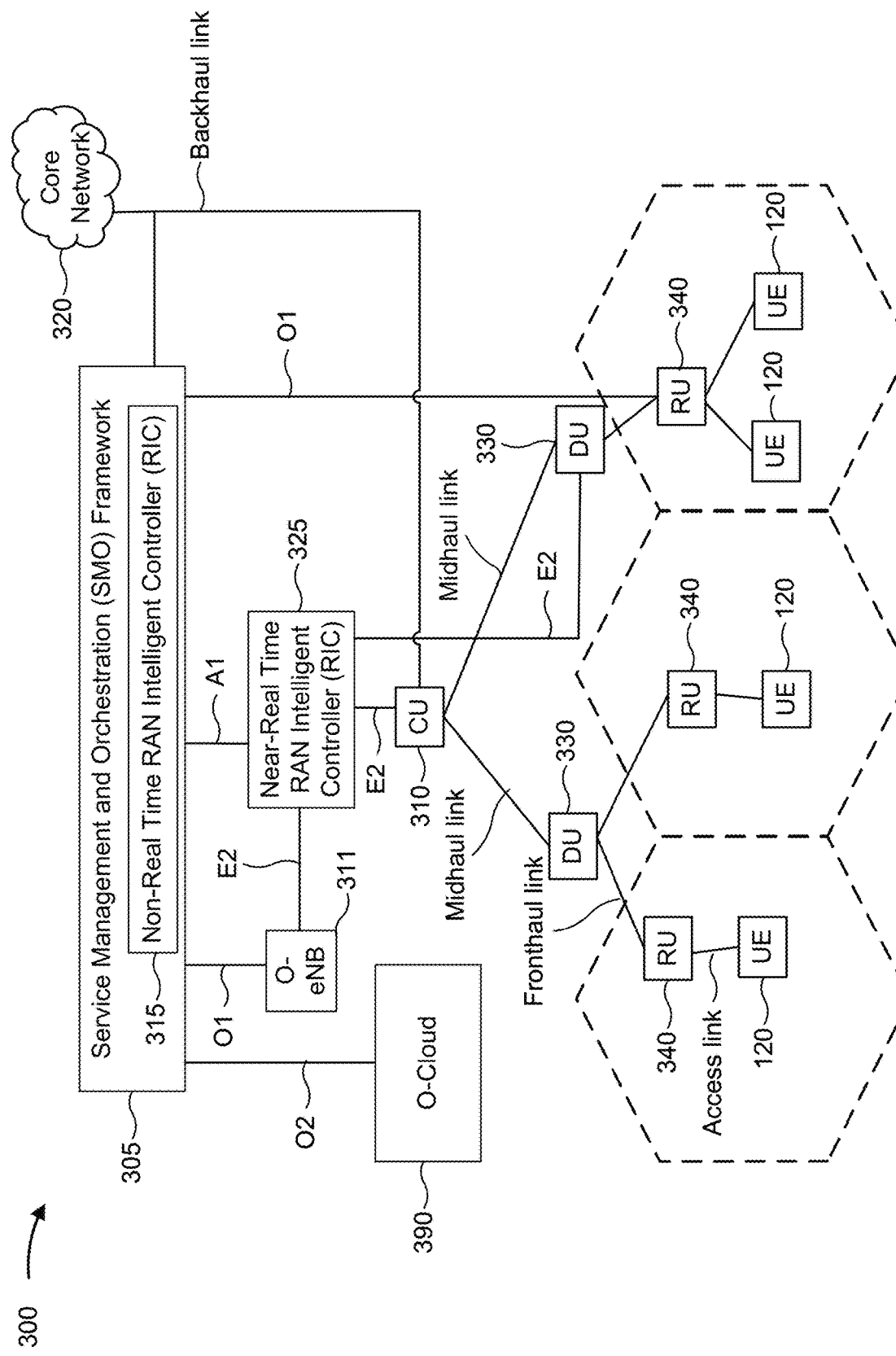
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (for example, a functional split defined by the 3GPP, such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework

305 (such as reconfiguration via an O1 interface) or via creation of RAN management policies (such as A1 interface policies).

Figure 4:
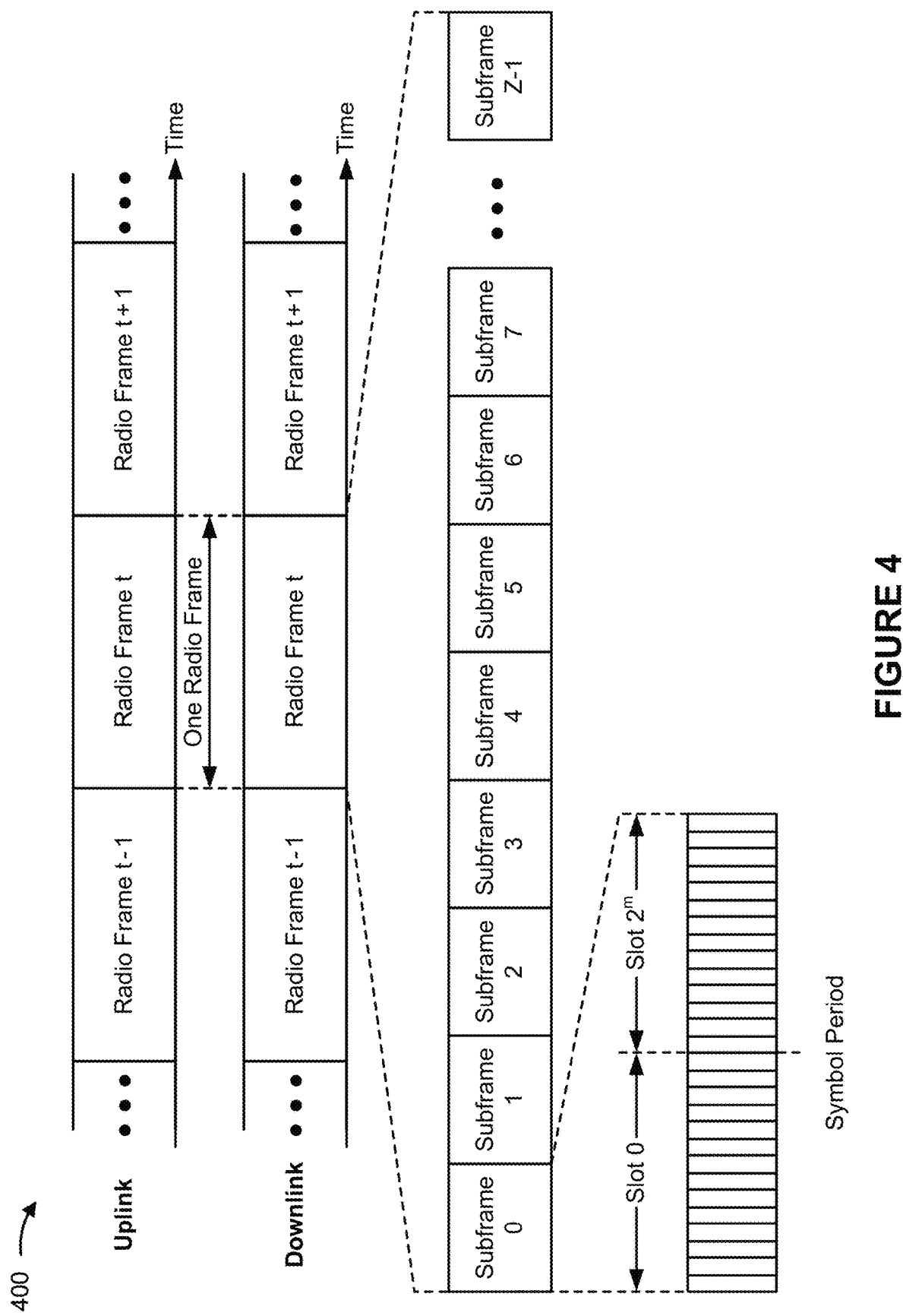
FIG. 4 is a diagram illustrating an example of a frame structure in a wireless communication network, in accordance with the present disclosure.

FIG. 4 is a diagram illustrating an example of a frame structure 400 in a wireless communication network, in accordance with the present disclosure. The frame structure shown in FIG. 4 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, 2m slots per subframe are shown in FIG. 4, where m is an index of a numerology used for a transmission, such as 0, 1, 2, 3, 4, or another quantity). Each slot may include a set of L symbol periods. For example, each slot may include fourteen symbol periods (for example, as shown in FIG. 4), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

In some examples, a communication may use a cyclic prefix (CP). The CP may be a normal CP (NCP) or an extended CP (ECP). Each slot may include 14 or 12 symbols, depending on whether the CP is normal or extended. For a NCP, each slot may include 14 symbols, and for an ECP, each slot may include 12 symbols. The symbols on the downlink may be CP orthogonal frequency division multiplexing (OFDM) (CP-OFDM) symbols. The symbols on the uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The quantity of slots within a subframe is based at least in part on the CP and the numerology. The numerology defines the subcarrier spacing (SCS) and, effectively, the symbol length or duration, which is equal to 1/SCS. The following table provides examples of different numerologies, SCSs, and CP types.

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For an NCP (14 symbols per slot), different numerologies, μ, 0 to 4 allow for 1, 2, 4, 8, and 16 slots, respectively, per subframe. For an ECP, the numerology 2 allows for 4 slots per subframe. Accordingly, for a NCP and numerology μ, there are 14 symbols per slot and $2^\mu$ slots per subframe. The subcarrier spacing may be equal to $2^\mu \ast 15$ kilohertz (kHz) where μ is the numerology 0 to 4. Therefore, the numerology μ=0 has a subcarrier spacing of 15 kHz and the numerology μ=4 has a subcarrier spacing of 240 kHz. The symbol length or duration is inversely related to the subcarrier spacing.

Within a set of frames, there may be one or more different bandwidth parts that are frequency division multiplexed. Each bandwidth part may have a particular numerology and CP (normal or extended).

In higher frequency communication scenarios, such as communications using a sub-THz frequency band, may experience relatively high phase noise (for example, compared to communications using a lower frequency), which may require a relatively large SCS. A relatively large SCS may cause symbols to be relatively short (for example, based at least in part on SCS and symbol lengths being inversely correlated). For example, communications using a sub-THz frequency band may use a numerology μ=6 with an SCS of 960 kHz. This may result in an approximate slot duration (for example, assuming 14 symbols per slot with a CP) of 15.6 microseconds. Comparatively, a slot format using a numerology of μ=3 with an SCS of 120 kHz, an approximate slot duration (for example, assuming 14 symbols per slot with a CP) may be 125 microseconds.

The sub-THz frequency band may be associated with relatively static and flat channel assumptions. For example, in the sub-THz frequency band, UEs may have relatively low mobility (for example, because the sub-THz frequency band may be associated with relatively narrow beams due to the relatively high phase noise associated with the higher frequencies). Additionally, the sub-THz frequency band may be associated with a relatively low delay spread and a strong line-of-sight component (for example, due to the relatively narrow beams used in the sub-THz frequency band). Because of the relatively static and flat channel assumptions and the relatively short slot durations and sampling times, the sub-THz frequency band may be associated with channel coherency that spans multiple slots. As used herein, two points in time may be associated with channel coherency if channel conditions at the two points in time are relatively the same (for example, if a first channel condition at a first time is within a threshold amount from a second channel condition at a second time). Compared to lower frequencies (such as those that use a numerology of μ=3 with an SCS of 120 kHz), a duration of time that would have otherwise spanned a single slot may span multiple slots (for example, approximately 8 slots as compared to a numerology of μ=3) in the sub-THz frequency band. For example, a duration of time that may span a single slot when a numerology of μ=3 with an SCS of 120 kHz is used may span multiple slots when a numerology μ=6 with an SCS of 960 kHz is used (for example, a duration of time that spans a single slot associated with a numerology of μ=3 may span approximately 8 slots associated with a numerology μ=6).

Figure 5:
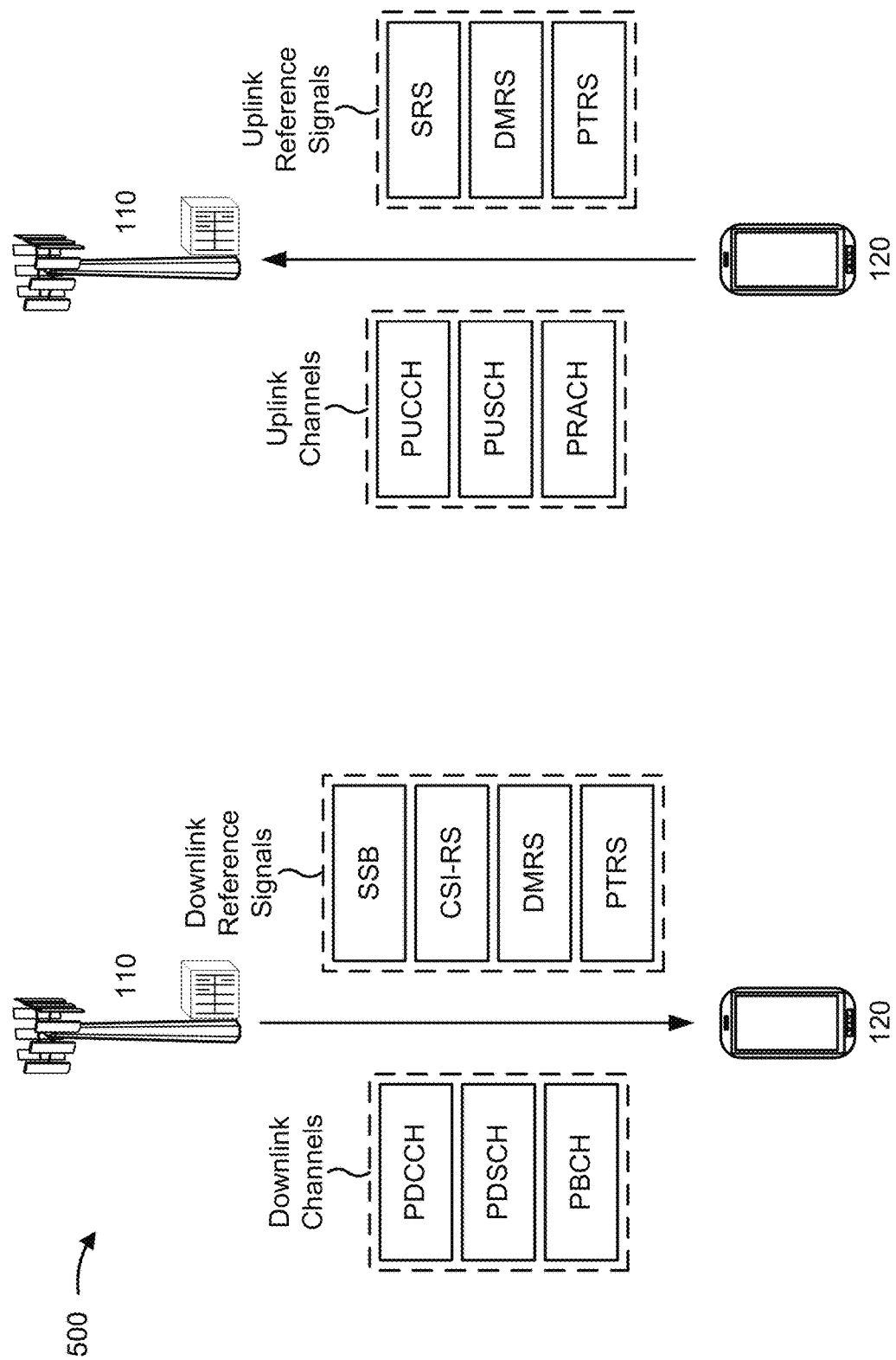
FIG. 5 is a diagram illustrating an example of physical channels and reference signals in a wireless network, in accordance with the present disclosure.

FIG. 5 is a diagram illustrating an example of physical channels and reference signals 500 in a wireless network, in accordance with the present disclosure. As shown in FIG. 5, downlink channels and downlink reference signals may carry information from a base station 110 to a UE 120, and uplink channels and uplink reference signals may carry information from a UE 120 to a network entity (depicted and described in FIG. 5 as a base station 110 as an example).

As shown, a downlink channel may include a physical downlink control channel (PDCCH) that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (for example, in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a quantity of transmission layers (for example, a rank), a precoding matrix (for example, a precoder), an MCS, or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. As shown, DMRSs are used for both downlink communications and uplink communications.

A DMRS pattern or sequence may be used in a data transmission to facilitate channel equalization, demodulation, or decoding, among other examples, by a receiving device. For example, a UE may receive a downlink communication having a control channel (for example, a PDCCH), data symbols of a data channel (for example, a PDSCH), and one or more occasions of DMRSs (for example, occupying one or more symbols of the data channel). In other examples, the base station 110 may receive an uplink communication having a control channel (for example, a PUCCH), a data channel (for example, a PUSCH), and one or more occasions of DMRSs (for example, occupying one or more symbols of the PUSCH). In other examples, a base station may receive a sidelink communication having a control channel (for example, a physical sidelink control channel (PSCCH)), a data channel (for example, a physical sidelink shared channel (PSSCH)), and one or more occasions of DMRSs (for example, occupying one or more symbols of the PSSCH). In some examples, each slot (for example, each uplink slot or each downlink slot) associated with communications may include at least one symbol that is associated with a DMRS to facilitate channel equalization, demodulation, or decoding, among other examples, associated with data communications transmitted during the slot.

In some networks, DMRSs may be transmitted within a message to provide a receiving device (for example, a base station or a UE, among other examples) with one or more reference signals to use for a determination of a channel estimation. The receiving device may estimate a channel to improve accuracy of demodulation or decoding of the message. The DMRSs may be configured based at least in part on one or more conditions (for example, channel conditions) to improve a likelihood of accurate channel estimation. For example, locations or a quantity of resources allocated for DMRSs may affect accuracy of channel estimation and spectral efficiency (for example, more resources allocated for DMRSs may improve accuracy of channel estimation at a cost of resources allocated for data). In some networks, a base station may provide a configuration of the DMRSs via RRC signaling.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

In some examples, a UE and a network entity may communicate using a high frequency band, such as the sub-THz frequency band. As described elsewhere herein, the sub-THz frequency band may be associated with channel coherency that spans over multiple slots (for example, because of the relatively static and flat channel and because of the shorter symbol durations and slot durations as compared to lower frequency bands). In the sub-THz frequency band, the UE and the network entity may communicate using a single-carrier OFDM (SC-OFDM) waveform with a time domain PTRS. The time domain PTRS may enable the UE and the network entity to estimate and mitigate residual frequency offset. This may result in a reduced phase drift or a reduced phase error accumulation over time. Therefore, because the sub-THz frequency band may be associated with channel coherency that spans over multiple slots and because phase noise and frequency offset corrections may be handled using PTRSs, DMRSs may not be needed in each slot to enable the UE and the network entity to achieve a sufficient channel estimation. Therefore, transmitting DMRSs in each slot in such examples may result in the UE and network entity consuming resources (for example, time domain resources, frequency domain resources, or processing resources) associated with communicating (for example, transmitting or receiving) one or more DMRSs or performing channel estimation based at least in part on the one or more DMRSs in each slot.

In some examples, the UE and the network entity may communicate using a relatively large bandwidth (for example, compared to lower frequencies). The high frequencies and large bandwidths used in high frequency bands, such as the sub-THz frequency band, may result sensitivity to uncompensated sampling time offset (STO). STO may refer to an offset or an error of a time at which a receiver (for example, a device receiving a signal) is to sample the signal. STO may also be referred to as symbol timing offset in some examples. For example, uncompensated STO may result in the receiver incorrectly determining slot boundaries or symbol boundaries, resulting in inter-symbol interference or degraded performance of communications, among other examples. When the UE and the network entity are communicating using a higher frequency band, such as the sub-THz frequency band, a relatively small uncompensated STO associated with a DMRS received by the receiver may result in a relatively high phase deviation for signals received in slots or symbols following the reception of the DMRS. Therefore, tracking loop (for example, a time tracking loop or a frequency tracking loop) updates may need to be performed more frequently for higher frequency bands (such as the sub-THz frequency band) than at lower frequency bands to ensure that errors associated with the tracking loops remain sufficiently low (for example, below a threshold error rate, such as 0.1 parts per million (PPM) error rate). A tracking loop may be associated with a receiver tracking changes to a frame timing of the network and an estimated time of arrival or estimated frequency of signals to be received by the receiver. For example, the receiver may receiver or measure a DMRS to perform tracking loop updates.

An accuracy of a tracking loop may be based at least in part on a synchronization reference signal (for example, an SSB or a tracking reference signal (TRS)) periodicity. For example, the accuracy of the tracking loop may be based at least in part on the synchronization reference signal periodicity and the effective rate of downlink data allocations. Additionally or alternatively, the accuracy of the tracking loop may be based at least in part on an SNR experienced by the receiver. For example, at higher SNR values, the accuracy of the tracking loop may be improved compared to the accuracy of the tracking loop at lower SNR values. Therefore, an expected amount of time drift or STO experienced by the receiver may be based at least in part on an amount of time from receiving a DMRS, a synchronization reference signal periodicity, or an SNR experienced by the receiver, among other examples.

For example, an error vector magnitude (EVM) associated with signals received by a receiver may be based at least in part on an amount of time from receiving a DMRS, a synchronization reference signal periodicity, or an SNR experienced by the receiver, among other examples. An EVM may reflect circuit distortion at the transmitting side, and an EVM measurement may be the normalized ratio of the difference between a measured signal and an ideal or reference signal. The difference is called the error vector. The EVM may be a metric that characterizes phase coherence across bands over time. For example, EVM may be a measure of the distance between the points on a constellation and their ideal locations. For example, for a given SSB periodicity and a given SNR, a received signal may be associated with different EVM measurements at different amounts of time (for example, in terms of a quantity of slots) from a received DMRS. Similarly, for a given amount of time from a received DMRS (for example, a given quantity of slots from a slot in which a DMRS was last received), different SNR values or different SSB periodicities may result in different EVM measurements. Therefore, a periodicity of DMRSs to ensure an EVM measurement for a given signal is satisfactory (for example, satisfies a threshold) may change over time depending on the synchronization reference signal periodicity or an SNR experienced by a receiver, among other examples. If the UE and the network entity were to communicate using a static inter-slot DMRS pattern (for example, associated with DMRSs being transmitted once every N slots), then communications between the UE and the network entity may experience time drift or STO caused by synchronization reference signal periodicity or an SNR experienced by the receiver changing over time (for example, at some points in time an EVM measurement may not satisfy the threshold due to synchronization reference signal periodicity or an SNR experienced by the receiver changing). This may result in degraded communication performance or inter-symbol interference experienced by the receiver, among other examples.

Various aspects relate generally to inter-slot DMRS patterns. Some aspects more specifically relate to dynamic or semi-static inter-slot DMRS patterns (for example, for communications using high frequency bands, such as the sub-THz frequency band). In some aspects, a UE may receive, from a network entity, an indication of an inter-slot DMRS pattern. The inter-slot DMRS pattern may indicate a subset of slots, from a set of slots, that include at least one DMRS of the one or more DMRSs. For example, higher frequency bands may be associated with data communications that span multiple slots (for example, due to the shortened slot duration and the increased data capacity in the higher frequency bands). The inter-slot DMRS pattern may indicate one or more slots, of the multiple slots, that include at least one DMRS of the one or more DMRSs.

In some aspects, the UE may receive the indication of the inter-slot DMRS pattern via an RRC message, a MAC-CE message, or a DCI message, among other examples. For example, an RRC message may indicate a set of inter-slot DMRS patterns corresponding to respective time domain resource allocation sizes (for example, in terms of a quantity of slots). As another example, a DCI message may include a set of indications that indicate one or more slots, of the multiple slots, that include at least one DMRS of the one or more DMRSs, where each indication of the set of indications corresponds to a respective slot of the multiple slots (for example, the DCI message may include a bitmap where each bit in the bitmap corresponds to a respective slot index). As another example, a MAC-CE message may activate an inter-slot DMRS pattern from a set of inter-slot DMRS patterns (for example, from a set of configured or pre-configured inter-slot DMRS patterns).

Particular aspects of the subject matter described in this disclosure can be implemented to realize one or more of the following potential advantages. In some examples, the described techniques can be used to enable DMRSs to be communicated once every N slots, rather than once in each slot. This may reduce a signaling overhead associated with the UE and the network entity communicating DMRSs, thereby increasing an achievable data throughput between the UE and the network entity. For example, allocating 1 DMRS symbol per slot versus 1 DMRS per N slots and assuming K PDSCH symbols per slot results in $$\left(\frac{NK-1}{(N-1)K}-1\right)$$

factor of throughput increase over N slots. For example, if N=10 and K=14 then an approximately 10% increase in throughput for data communication between the UE and the network entity may be achieved (for example, compared to allocating 1 DMRS symbol per slot).

Additionally, the described techniques can be used to enable inter-slot DMRS patterns used to communicate DMRSs between the UE and the network entity to be changed over time. For example, the network entity may change the inter-slot DMRS pattern based at least in part on one or more factors, such as a Doppler shift, an SNR value, a synchronization reference signal periodicity, or a scheduling scenario, among other examples. As a result, the inter-slot DMRS pattern may be adapted over time based at least in part on the one or more factors. This may result in improved time tracking or frequency tracking by a receiver, thereby improving communication performance for communications between the UE and the network entity.

Figure 6A:
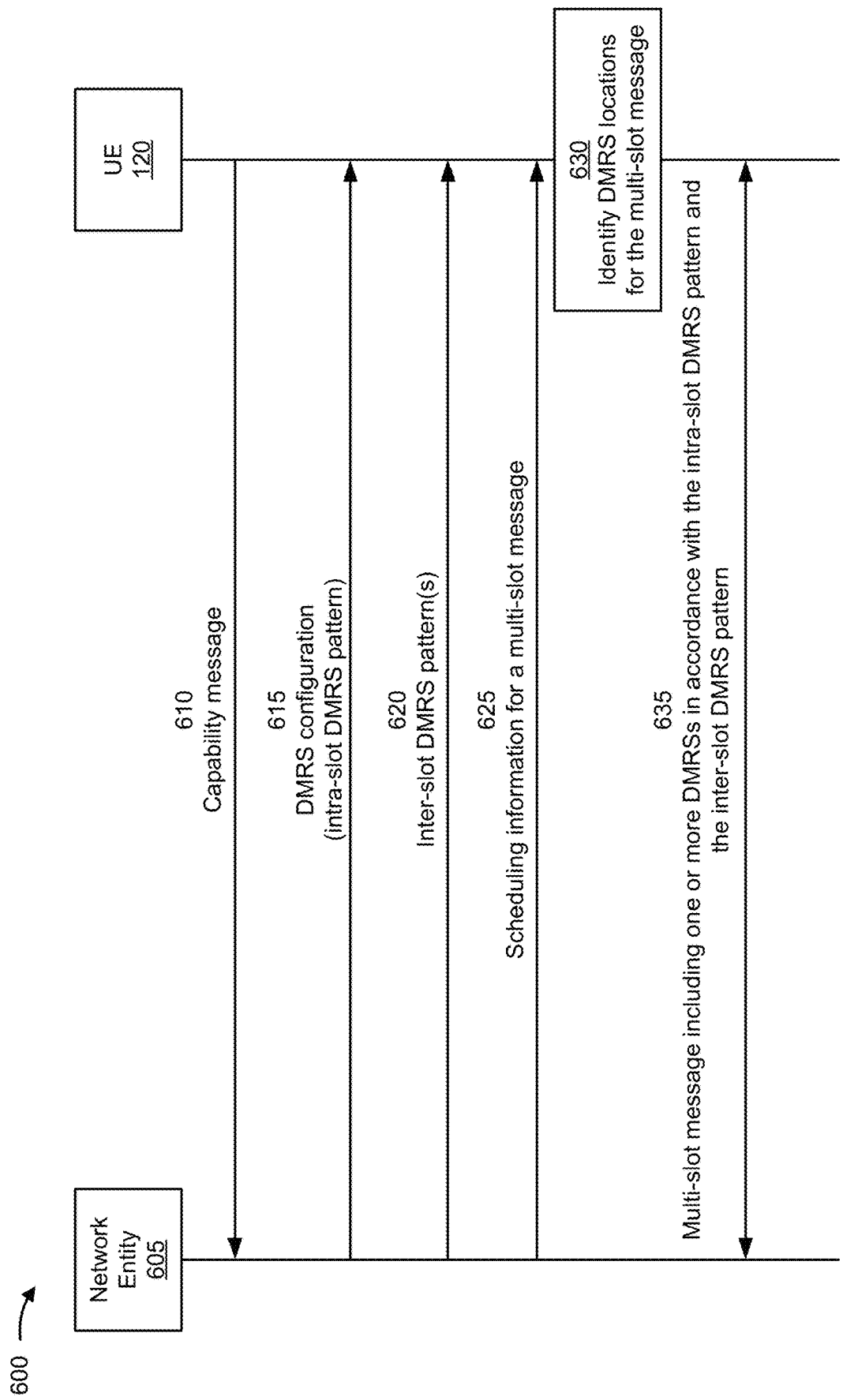
FIGS. 6A and 6B are diagrams of an example associated with inter-slot demodulation reference signal (DMRS) patterns, in accordance with the present disclosure.
Figure 6B:
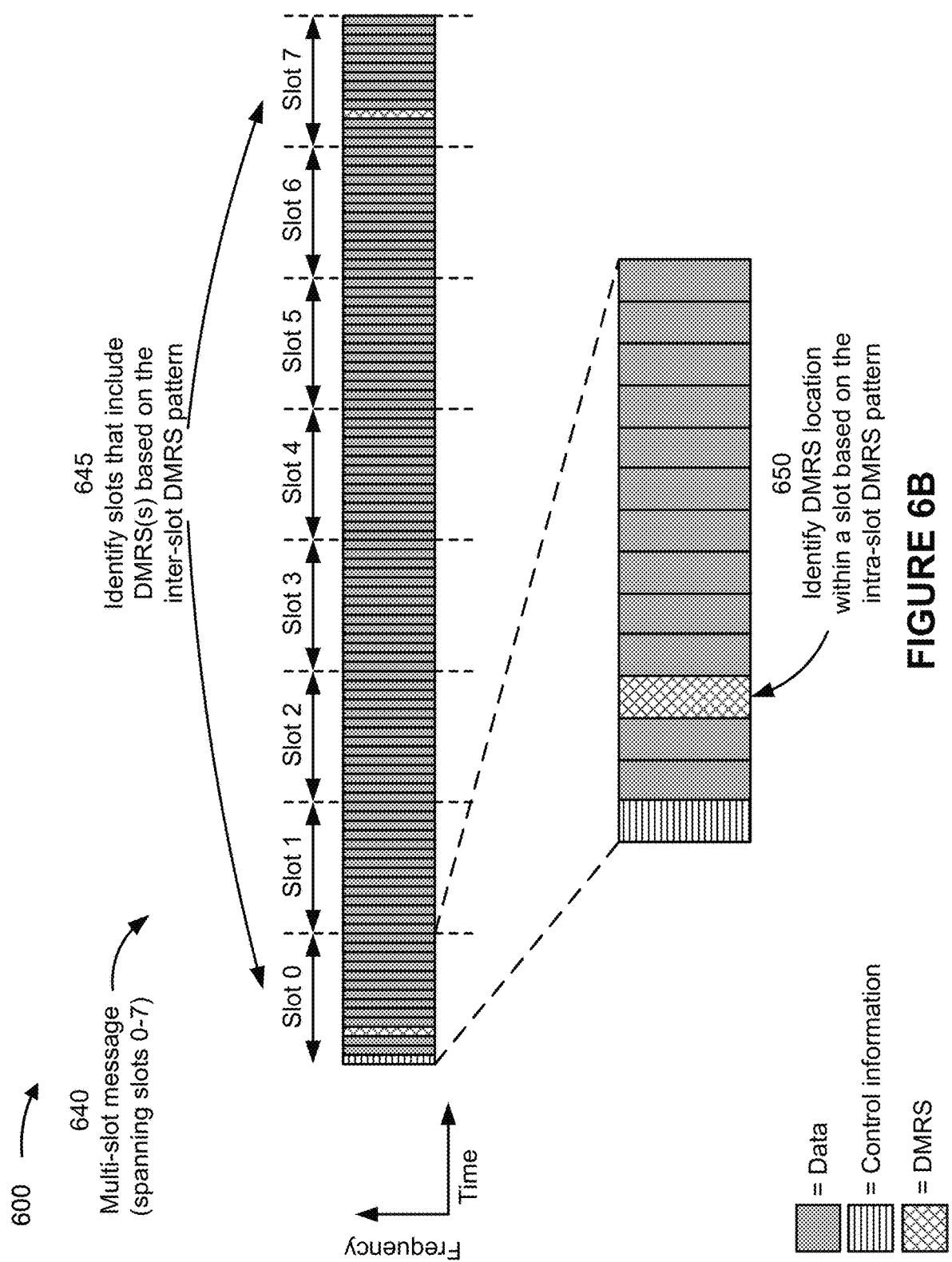

FIGS. 6A and 6B are diagrams of an example associated with inter-slot DMRS patterns 600, in accordance with the present disclosure. As shown in FIG. 6A, a network entity 605 (for example, a base station 110, a CU, a DU, or an RU) may communicate with a UE (for example, the UE 120). In some aspects, the network entity 605 and the UE 120 may be part of a wireless network (for example, the wireless network 100). The UE 120 and the network entity 605 may have established a wireless connection prior to operations shown in FIGS. 6A and 6B.

In some aspects, the network entity 605 may transmit, and the UE 120 may receive, configuration information. In some aspects, the UE 120 may receive the configuration information via one or more of RRC signaling, one or more MAC-CEs, or DCI, among other examples. In some aspects, the configuration information may include an indication of one or more configuration parameters (for example, already stored by the UE 120 or previously indicated by the network entity 605 or other network device) for selection by the UE 120, or explicit configuration information for the UE 120 to use to configure the UE 120, among other examples.

In some aspects, the configuration information may indicate that the UE 120 is to communicate with the network entity 605 using a high frequency band, such as the sub-THz frequency band. For example, the configuration information may indicate information associated with one or more bandwidth parts or component carriers associated with the sub-THz frequency band. In some aspects, the configuration information may indicate that the UE 120 and the network entity 605 are to communicate DMRSs in accordance with an inter-slot DMRS pattern, as explained in more detail elsewhere herein. For example, the configuration information may indicate that DMRSs are to be communicated (for example, transmitted or received) between the UE 120 and the network entity 605 once every few slots, rather than at least once per slot (for example, as may be the case for communications between the UE 120 and the network entity 605 when using a lower frequency band, such as FR1, FR2, or the millimeter wave frequency band). Although examples of inter-slot DMRS patterns are described herein in connection with the sub-THz frequency band, inter-slot DMRS patterns may be similarly applied as described herein in connection with other frequency bands, such as a frequency band higher than the sub-THz frequency band, FR1, FR2, or the millimeter wave frequency band, among other examples.

The UE 120 may configure itself based at least in part on the configuration information. In some aspects, the UE 120 may be configured to perform one or more operations described herein based at least in part on the configuration information.

In a first operation 610, the UE 120 may transmit, and the network entity 605 may receive, a capability message (for example, a capabilities report). In some aspects, the capability message may indicate UE support for inter-slot DMRS patterns (for example, for supporting communications or channel estimations using DMRSs that are communicated once every few slots, rather than at least once per slot). For example, the capability message may indicate a capability of the UE 120 associated with inter-slot DMRS patterns. In some aspects, the capability may indicate a quantity of slots that can be scheduled consecutively without including any DMRSs in the quantity of slots. For example, the capability message may indicate a maximum quantity of slots that can be scheduled (for example, by the network entity 605 or another network entity) for the UE 120 consecutively without any DMRS symbols.

In some aspects, the capability of the UE 120 may be based at least in part on an SNR range associated with communications with the network entity 605, an MCS associated with the communications with the network entity 605, or a synchronization reference signal periodicity (for example, an SSB periodicity, or a TRS periodicity), among other examples. For example, the capability message may indicate different capabilities of the UE 120 associated with inter-slot DMRS patterns for different SNR ranges, for different MCSs (for example, for different MCS index values or for different ranges of MCS index values), or for different synchronization reference signal periodicities, among other examples. For example, the capability message may indicate different maximum quantities of slots that can be scheduled (for example, by the network entity 605 or another network entity) for the UE 120 consecutively without any DMRS symbols for different SNR ranges, for different MCSs (for example, for different MCS index values or for different ranges of MCS index values), or for different synchronization reference signal periodicities, among other examples. The network entity 605 may determine one or more inter-slot DMRS patterns, as explained in more detail elsewhere herein, based at least in part on the information indicated by the capability message.

In a second operation 615, the UE 120 may receive, and the network entity 605 may transmit, a DMRS configuration. The DMRS configuration may indicate an intra-slot DMRS pattern. As used herein, "intra-slot DMRS pattern" may refer to one or more time domain resource locations (for example, one or more symbols) within a given slot that are to be associated with a DMRS. For example, the intra-slot DMRS pattern may indicate one or more time domain locations (for example, one or more symbol) of a DMRS, of one or more DMRSs associated with a communication that spans multiple slots (for example, a multi-slot communication), within a slot of the multiple slots. The DMRS configuration may be an RRC configuration. For example, the UE 120 may receive, and the network entity 605 may transmit, the DMRS configuration using RRC signaling. The DMRS configuration may indicate one or more DMRS parameters. The one or more DMRS patterns may be RRC parameter. The one or more DMRS parameters may include a first parameter (for example, dmrs-Type) that indicates a DMRS Type (for example, type1 or type2), a second parameter (for example, dmrs-AdditionalPosition) that indicates a quantity of DMRS locations per slot (for example, 1, 2, 3, or 4, among other examples), a third parameter (for example, maxLength) that indicates a maximum quantity of DMRS symbols per DMRS location (for example, 1 or 2 consecutive DMRS symbols), or a fourth parameter (for example, dmrs-TypeA-Position) that indicates first DMRS symbol location index (for example, 2, or 3) if Type A DMRS is selected, among other examples. The one or more DMRS parameters may be defined, or otherwise fixed, by a wireless communication standard, such as the 3GPP (for example, in 3GPP Technical Specification 38.211 Version 17.0.0). The one or more DMRS parameters may indicate the intra-slot DMRS pattern. For example, the UE 120 may identify one or more symbols, within a given slot, that are to be associated with a DMRS based at least in part on the one or more DMRS parameters.

For example, the network entity 605 may indicate the intra-slot DMRS pattern to be used for communicating DMRSs between the UE 120 and the network entity 605 using an RRC configuration in a similar manner as defined, or otherwise fixed, by a wireless communication standard, such as the 3GPP (for example, in 3GPP Technical Specification 38.211 Version 17.0.0). However, rather than the intra-slot DMRS pattern indicating DMRS time domain locations for each allocation (for example, for each scheduled slot or each scheduled communication), the intra-slot DMRS pattern may indicate DMRS locations within a slot that includes a DMRS as indicated by an inter-slot DMRS pattern, as explained in more detail elsewhere herein.

In a third operation 620, the UE 120 may receive, and the network entity 605 may transmit, an indication of one or more inter-slot DMRS patterns. As described elsewhere herein, an inter-slot DMRS pattern may indicate one or more slots, of multiple slots, that include at least one DMRS of the one or more DMRSs. In other words, for a set of slots, the inter-slot DMRS pattern may indicate a subset of slots, from the set of slots, that include at least one DMRS. As described herein, the inter-slot DMRS patterns may be based at least in part on an assumption that communications in the higher frequency bands, such as in the sub-THz frequency band, use a similar, or the same, slot or frame format as communications in lower frequency bands, such as in FR1, FR2, or the millimeter wave bands. For example, the inter-slot DMRS patterns may be based at least in part on an assumption that communications in the higher frequency bands use a slot format in which each slot includes 14 symbols and a CP.

In other examples, such as where communications in the higher frequency bands use a slot format in which each slot includes more than 14 symbols, the inter-slot DMRS pattern(s) described herein may not be "inter-slot," but may rather be at least partially intra-slot DMRS pattern(s). For example, if a slot format used for communications between the UE 120 and the network entity 605 is associated with more than 14 symbols in each slot, the inter-slot DMRS patterns described herein may result in a given slot including more than 1 DMRS, or in each slot including at least 1 DMRS. In other words, the inter-slot DMRS patterns described herein may be associated with configuring or indicating that DMRSs are to be communicated less frequently between the UE 120 and the network entity 605 (for example, compared to a rate at which DMRSs are communicated in lower frequency bands) while also enabling the network entity to change the rate at which DMRSs are to be communicated between the UE 120 and the network entity 605 over time, as explained in more detail elsewhere herein.

In some aspects, the indication of the one or more inter-slot DMRS patterns may be included in an RRC configuration. For example, the UE 120 may receive, and the network entity 605 may transmit, an RRC message indicating the inter-slot DMRS pattern. In some aspects, the RRC message may indicate the inter-slot DMRS pattern and the DMRS configuration described above in connection with the second operation 615. In other words, the DMRS configuration and the indication of the inter-slot DMRS pattern may be included in the same RRC message. For example, in some cases, the second operation 615 and the third operation 620 may be performed in a single operation (for example, the DMRS configuration and the inter-slot DMRS pattern(s) may be configured together in a single RRC configuration). In some other aspects, the RRC message may be different than an RRC message that indicates the DMRS configuration.

In some aspects, the RRC message that indicate the one or more inter-slot DMRS patterns may indicate a set (for example, one or more) of inter-slot DMRS patterns corresponding to respective time domain resource allocation sizes (for example, in terms of quantities of slots). For example, the RRC message may include one or more parameters that indicate information that is defined, or otherwise fixed, by a table with one or more predefined or configured options for inter-slot DMRS patterns, which each predefined or configured option being associated with a respective multiple slot (for example, multi-slot) allocation length or size (for example, in terms of a quantity of concatenated or consecutive slots). In other words, the table may include one or more rows. A given row, of the one or more rows, may correspond to a given time domain resource allocation size (for example, a quantity of slots). The table may include one or more columns indicating different options for inter-slot DMRS patterns. The table may be defined, or otherwise fixed, by a wireless communication standard, such as the 3GPP.

Therefore, the network entity 605 may indicate values for one or more parameters (for example, parameter included in the table) to indicate different inter-slot DMRS patterns for different time domain resource allocation sizes. The indicated parameters may be used by the UE 120 to identify one or more slots, from the quantity of slots for a given scheduled communication, are to include a DMRS. The UE 120 may use DMRS parameters indicated by the DMRS configuration (for example, received by the UE 120 in the second operation 615) to identify one or more symbols, within the one or more slots, that are to be associated with a DMRS. For example, as described in more detail elsewhere herein, the UE 120 may receive scheduling information (for example, in a fourth operation 625) indicating a quantity of slots associated with a given communication. The UE 120 may use the table and the indicated parameters associated with the inter-slot DMRS patterns to identify an inter-slot DMRS pattern to be associated with the given communication (for example, by identifying a row from the table based at least in part on the quantity of slots scheduled for the given communication). Therefore, as described in more detail elsewhere herein, the UE 120 may use a combination of an intra-slot DMRS pattern and an inter-slot DMRS pattern, for a given scheduled allocation size, to identify one or more DMRS time domain locations (for example, one or more DMRS symbol locations).

In some other aspects, in the third operation 620, the UE 120 may receive, and the network entity 605 may transmit, a dynamic message indicating an inter-slot DMRS pattern. For example, the UE 120 may receive, and the network entity 605 may transmit, a DCI message indicating an inter-slot DMRS pattern. In some aspects, the DCI message may also schedule a message (for example, a multi-slot message) that is to be associated with the inter-slot DMRS pattern (for example, as described below in connection with the fourth operation 625). In such examples, the third operation 620 and the fourth operation 625 may be performed in a single operation (for example, in a single transmission or reception of the DCI message). In some aspects, the DCI message may include one or more indications that indicate one or more respective slots, of multiple slots allocated for the message, that include at least one DMRS. For example, the one or more indications may include, or may be, a bitmap. For example, each indication (each bit) may correspond to a respective slot index of the multi-slot allocation associated with the communication. A given indication (for example, a given bit of the bitmap) may include a value indicating whether the slot associated with given indication includes at least one DMRS. For example, a value of "0" may indicate that the slot associated with given indication does not include any DMRSs. A value of "1" may indicate that the slot associated with given indication includes at least one DMRS (for example, where the symbol location(s) of the at least one DMRS within the slot are indicated by the intra-slot DMRS pattern or the DMRS configuration received by the UE 120 in the second operation 615).

In some aspects, a quantity of indications included in the one or more indications (for example, a quantity of bits included in the bitmap) may be based at least in part on a first quantity of slots that can be scheduled together consecutively (for example, where the first quantity of slots is based at least in part on a network capability or restriction or is based at least in part on the capability of the UE 120 indicated in the first operation 610). Alternatively, the quantity of indications included in the one or more indications (for example, a quantity of bits included in the bitmap) may be based at least in part on a second quantity of slots included in the multiple slots (for example, the quantity of bits included in the bitmap may be the quantity of slots allocated for the given communication). The one or more indications (for example, the bitmap) included in the DCI message may provide additional flexibility for the network entity to adapt or change the inter-slot DMRS pattern to be associated with a given communication (for example, based at least in part on a current scenario or current metrics associated with a link between the UE 120 and the network entity 605), as explained in more detail elsewhere herein.

In some other aspects, in the third operation 620, the UE 120 may receive, and the network entity 605 may transmit, a MAC-CE message indicating one or more inter-slot DMRS patterns. For example, the MAC-CE message may activate the one or more inter-slot DMRS pattern from a set of inter-slot DMRS patterns. In some aspects, the UE 120 may receive, and the network entity 605 may transmit, an indication of the set of inter-slot DMRS patterns. For example, the set of inter-slot DMRS patterns may be included in an RRC configuration (for example, in a similar manner as described above). The MAC-CE message may activate one or more inter-slot DMRS patterns from the RRC configured inter-slot DMRS patterns. Alternatively, the set of inter-slot DMRS patterns may be preconfigured or not signaled to the UE 120 (for example, the set of inter-slot DMRS patterns may be defined, or otherwise fixed, by a wireless communication standard, such as the 3GPP).

The MAC-CE message may activate one or more inter-slot DMRS patterns corresponding to respective time domain resource allocation sizes (for example, in terms of a quantity of slots). For example, the network entity 605 may transmit the MAC-CE message to activate respective inter-slot DMRS patterns for different time domain resource allocation sizes (for example, in terms of a quantity of slots). In other words, the MAC-CE message may activate a first inter-slot DMRS pattern for allocations associated with a first quantity of slots, a second inter-slot DMRS pattern for allocations associated with a second quantity of slots, or a third inter-slot DMRS pattern for allocations associated with a third quantity of slots, among other examples. The UE 120 may select an inter-slot DMRS pattern, from the activated inter-slot DMRS patterns, to be used for a given message based at least in part on the quantity of slots allocated for the given message (for example, as indicated by scheduling information, such as in the fourth operation 625).

The dynamic signaling (for example, using a DCI message or a MAC-CE message) may enable the network entity 605 to adapt or change an inter-slot DMRS pattern used for communication based at least in part on a current scenario or one or more metrics associated with the communication link between the UE 120 and the network entity 605. For example, the network entity 605 may determine one or more inter-slot DMRS patterns to be indicated or activated for the UE 120. The network entity 605 may determine the one or more inter-slot DMRS patterns based at least in part on Doppler parameters (for example, Doppler spread or Doppler shift) associated with the UE 120, a mobility of the UE 120, an SNR associated with the link between the UE 120 and the network entity 605, a channel coherency constraint (for example, a maximum quantity of consecutive slots that do not include any DMRS symbols), an effective synchronization reference signal periodicity (for example, considering an SSB periodicity, a TRS periodicity, or a PDSCH and PTRS scheduling rate), a scheduling scenario (for example, considering whether a given communication is proximate in time to a beam switch, a discontinuous reception (DRX) cycle wakeup, among other examples that may affect a convergence of a UE tracking loop), an interference pattern associated with the UE 120 (for example, if the UE is at, or near, an edge of a cell and increased interference is expected), among other examples. As a result, the network entity 605 may determine an optimized inter-slot DMRS pattern to reduce a quantity of resources used to transmit DMRSs while also ensuring that DMRSs are transmitted frequently enough for the UE 120 to perform accurate channel estimations and to perform accurate frequency tracking or time tracking, thereby resulting in a reduced phase noise or time drift associated with communications between the UE 120 and the network entity 605.

In the fourth operation 625, the UE 120 may receive, and the network entity 605 may transmit, scheduling information of a multi-slot message. For example, the scheduling information may indicate that the message is associated with a time domain resource allocation that includes multiple slots. The scheduling information may be included in control information carried by a PDCCH message (for example, in a DCI message). In some aspects, the scheduling information may be included in a DCI message received by the UE 120 in the third operation 620 (for example, if a DCI message is used to indicate the inter-slot DMRS pattern for the message). The multi-slot message may be the multi-slot message 640 depicted in FIG. 6B.

In a fifth operation 630, the UE 120 may identify one or more DMRS locations (for example, time domain locations or symbol locations) for the multi-slot message. For example, the UE 120 may identify one or more slots, from the multiple slots allocated for the multi-slot message, that include at least one DMRS based at least in part on an inter-slot DMRS pattern associated with the multi-slot message. The UE 120 may identify the inter-slot DMRS pattern based at least in part on information received by the UE 120 in the third operation 620. For example, the UE 120 may select the inter-slot DMRS pattern, from a set of configured (for example, RRC configured) or activated (for example, via a MAC-CE message) inter-slot DMRS patterns, based at least in part on a quantity of slots allocated for the multi-slot message. In some other aspects, the UE 120 may identify the inter-slot DMRS pattern based at least in part on one or more indications (for example, a bitmap) included in the DCI message (for example, that schedules the multi-slot message).

The UE 120 may identify one or more DMRS locations (for example, one or more symbol locations) within each slot that includes at least one DMRS (for example, as identified by the UE 120 based at least in part on the inter-slot DMRS pattern) based at least in part on the intra-slot DMRS pattern. For example, the intra-slot DMRS pattern may be indicated by one or more DMRS parameters included in the DMRS configuration (for example, received by the UE 120 in the second operation 615). In this way, the UE 120 may identify a subset of slots, of a set of slots allocated for the multi-slot message, that include a DMRS (for example, based at least in part on the inter-slot DMRS pattern) and may identify one or more symbol locations within those slots associated with a DMRS (for example, based at least in part on the intra-slot DMRS pattern).

In a sixth operation 635, the UE 120 may communicate (for example, transmit or receive) the multi-slot message (for example, a message that is associated with a time domain resource allocation that includes multiple slots) with the network entity 605, where the multi-slot message includes one or more DMRSs in accordance with the intra-slot DMRS pattern and the inter-slot DMRS pattern. For example, in some aspects, the UE 120 may receive, and the network entity 605 may transmit, the multi-slot message (for example, a PDSCH message) including one or more DMRSs as indicated by the intra-slot DMRS pattern and the inter-slot DMRS pattern. In some other aspects, the UE 120 may transmit, and the network entity 605 may receive, the multi-slot message (for example, a PUSCH message) including one or more DMRSs as indicated by the intra-slot DMRS pattern and the inter-slot DMRS pattern. The UE 120 and the network entity may communicate the message (for example, the multi-slot message) via a high frequency band, such as via the sub-THz frequency band.

As shown in FIG. 6B, a multi-slot message 640 may include a time domain resource allocation of 8 slots (for example, the multi-slot message 640 may span slot 0 through slot 7 as shown in FIG. 6B). In a seventh operation 645 (for example, which may be a part of the fifth operation 630), the UE 120 may identify slots that include one or more DMRSs based at least in part on the inter-slot DMRS pattern associated with the multi-slot message 640. For example, as shown in FIG. 6B, the inter-slot DMRS pattern may indicate that only slot 0 and slot 7 include a DMRS (for example, slot 1, slot, 2, slot 3, slot 4, slot 5, and slot 6 may not include any DMRSs and may only include symbols allocated for data communications, such data communicated via the PDSCH or the PUSCH). For example, a DCI may include one or more indications (for example, a bitmap) of {1,0,0,0,0,0,0, 1}, where each indication (for example, each bit) corresponds to a respective slot. The values of "1" may indicate that at least one DMRS is included in the slot associated with, or mapped to, the indication (for example, the bit), whereas the values of "0" may indicate that no DMRSs are included in the slot associated with, or mapped to, the indication (for example, the bit). In some other aspects, the inter-slot DMRS pattern associated with the multi-slot message 640 may be indicated to the UE 120 in another manner as described in more detail elsewhere herein (for example, via an RRC message or a MAC-CE message, among other examples).

In an eighth operation 650 (for example, which may be a part of the fifth operation 630), the UE 120 may identify one or more DMRS locations within a slot based at least in part on the intra-slot DMRS pattern associated with the multi-slot message 640. For example, in slot 1, the UE 120 may identify that the fourth symbol in slot 1 is to be associated with a DMRS based at least in part on the intra-slot DMRS pattern. For example, the intra-slot DMRS pattern may indicate that the fourth symbol, or the third symbol after a symbol associated with control information, is to include a DMRS. The inter-slot DMRS pattern shown in FIG. 6B is provided as an example. In other examples, multiple symbols in slot 1 may be associated with a DMRS. The UE 120 may identify one or more DMRS locations within slot 7 in a similar manner.

In some aspects, a PTRS (for example, a time domain PTRS) may be mapped to each data symbol of the multi-slot message 640 to enable the UE 120 to perform phase noise mitigation or frequency offset mitigation. For example, the symbols shown in FIG. 6B as being associated with data (for example, as being associated with the PDSCH or the PUSCH) may also be associated with a PTRS. The UE 120 may receive or measure the PTRS(s) to perform phase noise mitigation or frequency offset mitigation for the multi-slot message 640.

Because the higher frequency used to communicate the multi-slot message 640 (for example, a frequency in the sub-THz frequency band) may result in a channel that is relatively flat or static over time and may be associated with relatively short slot durations, as described in more detail elsewhere herein, operations associated with a DMRS (for example, channel estimation, noise estimation, or interference estimation, among other examples) may not need to be performed in each slot. As a result, the UE 120 and the network entity may conserve resources (for example, time domain resources and frequency domain resources) that would have otherwise been used to transmit DMRS in each slot associated with the multi-slot message 640. This may increase a throughput associated with the multi-slot message 640 because slot 1 through slot 6 may be associated with communicating data, rather than having one or more symbols associated with a DMRS (rather than data).

Figure 7:
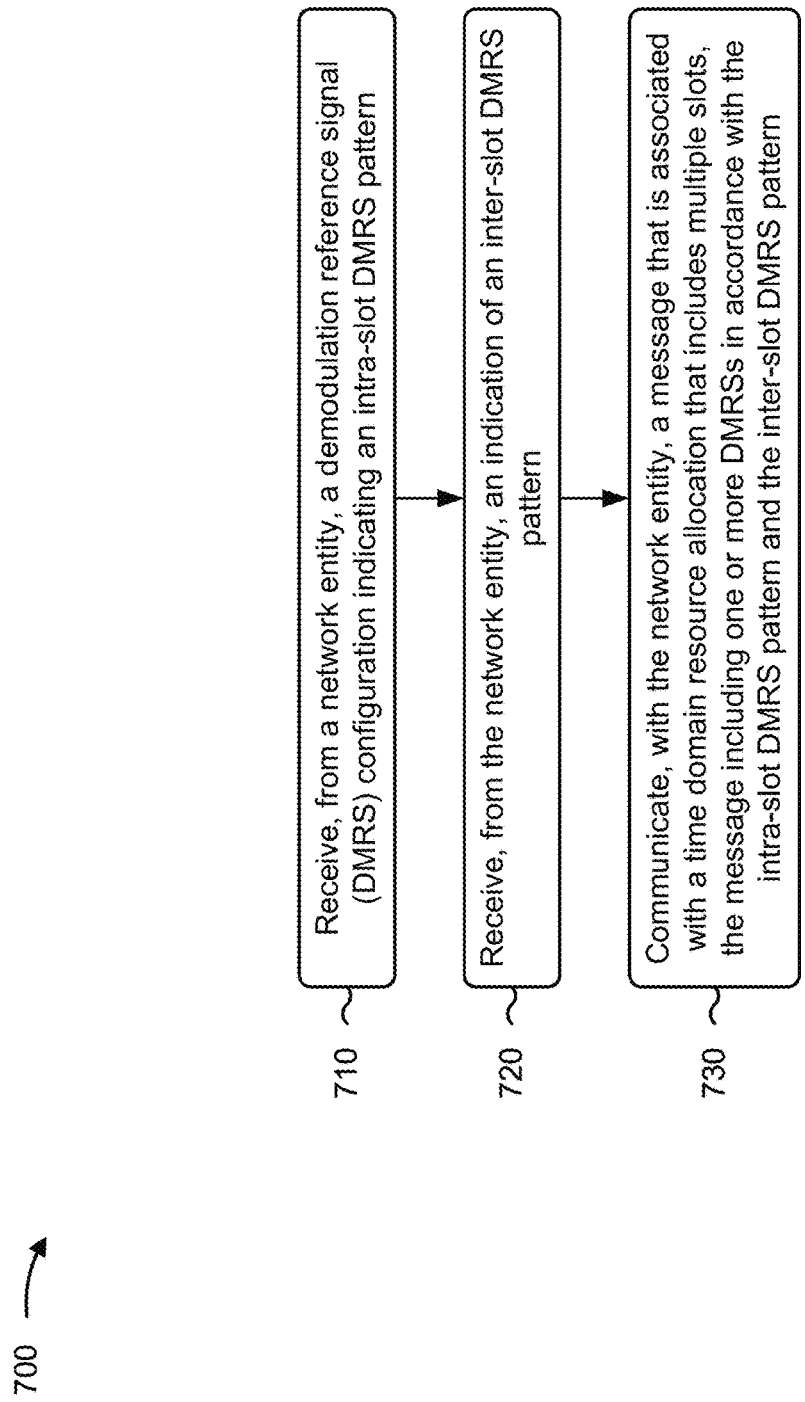
FIG. 7 is a flowchart illustrating an example process performed, for example, by a UE, associated with inter-slot DMRS patterns, in accordance with the present disclosure.

FIG. 7 is a flowchart illustrating an example process 700 performed, for example, by a UE, associated with inter-slot DMRS patterns, in accordance with the present disclosure. Example process 700 is an example where the UE (for example, UE 120) performs operations associated with inter-slot DMRS patterns.

As shown in FIG. 7, in some aspects, process 700 may include receiving, from a network entity, a DMRS configuration indicating an intra-slot DMRS pattern (block 710). For example, the UE (such as by using communication manager 140 or reception component 902, depicted in FIG. 9) may receive, from a network entity, a DMRS configuration indicating an intra-slot DMRS pattern, as described above.

As further shown in FIG. 7, in some aspects, process 700 may include receiving, from the network entity, an indication of an inter-slot DMRS pattern (block 720). For example, the UE (such as by using communication manager 140 or, depicted in FIG. 9) may receive, from the network entity, an indication of an inter-slot DMRS pattern, as described above.

As further shown in FIG. 7, in some aspects, process 700 may include communicating, with the network entity, a message that is associated with a time domain resource allocation that includes multiple slots, the message including one or more DMRSs in accordance with the intra-slot DMRS pattern and the inter-slot DMRS pattern (block 730). For example, the UE (such as by using communication manager 140, reception component 902, or transmission component 904, depicted in FIG. 9) may communicate, with the network entity, a message that is associated with a time domain resource allocation that includes multiple slots, the message including one or more DMRSs in accordance with the intra-slot DMRS pattern and the inter-slot DMRS pattern, as described above.

Process 700 may include additional aspects, such as any single aspect or any combination of aspects described below or in connection with one or more other processes described elsewhere herein.

In a first additional aspect, the intra-slot DMRS pattern indicates one or more time domain locations of a DMRS, of the one or more DMRSs, within a slot of the multiple slots, and the inter-slot DMRS pattern indicates one or more slots, of the multiple slots, that include at least one DMRS of the one or more DMRSs.

In a second additional aspect, alone or in combination with the first aspect, the multiple slots include a set of slots, and the inter-slot DMRS pattern indicates a subset of slots, from the set of slots, that include at least one DMRS of the one or more DMRSs.

In a third additional aspect, alone or in combination with one or more of the first and second aspects, receiving the indication of the inter-slot DMRS pattern includes receiving an RRC message indicating the inter-slot DMRS pattern.

In a fourth additional aspect, alone or in combination with one or more of the first through third aspects, the RRC message indicates a set of inter-slot DMRS patterns corresponding to respective time domain resource allocation sizes, and process 700 includes selecting the inter-slot DMRS pattern from the set of inter-slot DMRS patterns based at least in part on a quantity of slots included in the multiple slots.

In a fifth additional aspect, alone or in combination with one or more of the first through fourth aspects, the DMRS configuration and the indication of the inter-slot DMRS pattern are included in the RRC message.

In a sixth additional aspect, alone or in combination with one or more of the first through fifth aspects, receiving the indication of the inter-slot DMRS pattern includes receiving a DCI message indicating the inter-slot DMRS pattern.

In a seventh additional aspect, alone or in combination with one or more of the first through sixth aspects, the DCI message schedules the message.

In an eighth additional aspect, alone or in combination with one or more of the first through seventh aspects, the DCI message includes one or more indications that indicate one or more respective slots, of the multiple slots, that include at least one DMRS of the one or more DMRSs.

In a ninth additional aspect, alone or in combination with one or more of the first through eighth aspects, the one or more indications includes a bitmap.

In a tenth additional aspect, alone or in combination with one or more of the first through ninth aspects, a quantity of indications included in the one or more indications is based at least in part on a first quantity of slots that can be scheduled together consecutively or on a second quantity of slots included in the multiple slots.

In an eleventh additional aspect, alone or in combination with one or more of the first through tenth aspects, receiving the indication of the inter-slot DMRS pattern includes receiving a MAC-CE message indicating the inter-slot DMRS pattern.

In a twelfth additional aspect, alone or in combination with one or more of the first through eleventh aspects, the MAC-CE message activates the inter-slot DMRS pattern from a set of inter-slot DMRS patterns.

In a thirteenth additional aspect, alone or in combination with one or more of the first through twelfth aspects, process 700 includes receiving, from the network entity, an indication of the set of inter-slot DMRS patterns.

In a fourteenth additional aspect, alone or in combination with one or more of the first through thirteenth aspects, the MAC-CE message activates one or more inter-slot DMRS patterns corresponding to respective time domain resource allocation sizes.

In a fifteenth additional aspect, alone or in combination with one or more of the first through fourteenth aspects, process 700 includes selecting the inter-slot DMRS pattern from the one or more inter-slot DMRS patterns based at least in part on a quantity of slots included in the multiple slots.

In a sixteenth additional aspect, alone or in combination with one or more of the first through fifteenth aspects, process 700 includes transmitting, to the network entity, a capability message indicating a capability of the UE associated with inter-slot DMRS patterns.

In a seventeenth additional aspect, alone or in combination with one or more of the first through sixteenth aspects, the capability indicates a quantity of slots that can be scheduled consecutively without including any DMRSs in the quantity of slots.

In an eighteenth additional aspect, alone or in combination with one or more of the first through seventeenth aspects, the capability is based at least in part on at least one of an SNR range associated with communications with the network entity, an MCS associated with the communications with the network entity, an SSB periodicity, or a TRS periodicity.

In a nineteenth additional aspect, alone or in combination with one or more of the first through eighteenth aspects, communicating the message includes communicating the message via a sub-THz frequency band.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
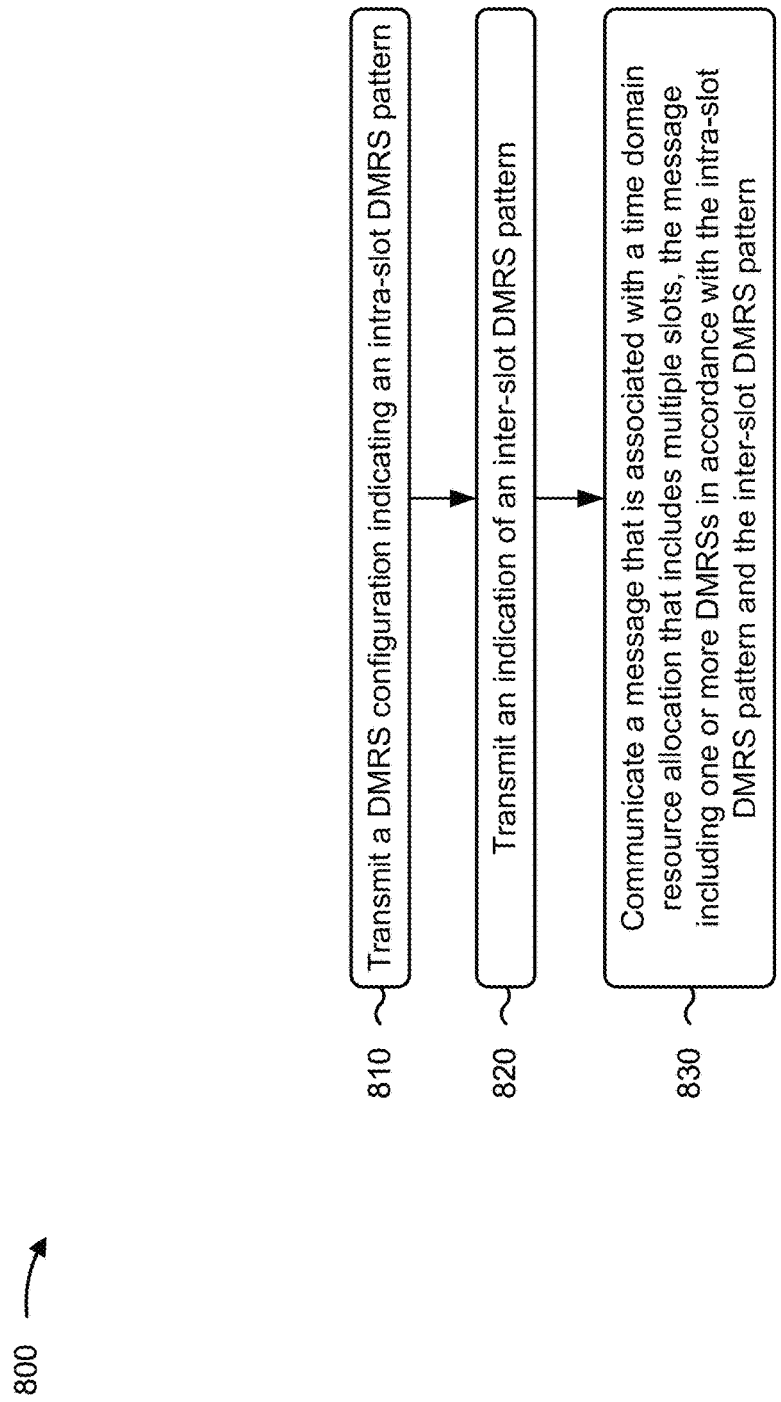
FIG. 8 is a flowchart illustrating an example process performed, for example, by a network entity, associated with inter-slot DMRS patterns, in accordance with the present disclosure.

FIG. 8 is a flowchart illustrating an example process 800 performed, for example, by a network entity, associated with inter-slot DMRS patterns, in accordance with the present disclosure. Example process 800 is an example where the network entity (for example, the network entity 605, the base station 110, a CU, a DU, or an RU, among other examples) performs operations associated with inter-slot DMRS patterns.

As shown in FIG. 8, in some aspects, process 800 may include transmitting a DMRS configuration indicating an intra-slot DMRS pattern (block 810). For example, the network entity (such as by using communication manager 150 or transmission component 1004, depicted in FIG. 10) may transmit a DMRS configuration indicating an intra-slot DMRS pattern, as described above.

As further shown in FIG. 8, in some aspects, process 800 may include transmitting an indication of an inter-slot DMRS pattern (block 820). For example, the network entity (such as by using communication manager 150 or transmission component 1004, depicted in FIG. 10) may transmit an indication of an inter-slot DMRS pattern, as described above.

As further shown in FIG. 8, in some aspects, process 800 may include communicating a message that is associated with a time domain resource allocation that includes multiple slots, the message including one or more DMRSs in accordance with the intra-slot DMRS pattern and the inter-slot DMRS pattern (block 830). For example, the network entity (such as by using communication manager 150, reception component 1002, or transmission component 1004, depicted in FIG. 10) may communicate a message that is associated with a time domain resource allocation that includes multiple slots, the message including one or more DMRSs in accordance with the intra-slot DMRS pattern and the inter-slot DMRS pattern, as described above.

Process 800 may include additional aspects, such as any single aspect or any combination of aspects described below or in connection with one or more other processes described elsewhere herein.

In a first additional aspect, the intra-slot DMRS pattern indicates one or more time domain locations of a DMRS, of the one or more DMRSs, within a slot of the multiple slots, and the inter-slot DMRS pattern indicates one or more slots, of the multiple slots, that include at least one DMRS of the one or more DMRSs.

In a second additional aspect, alone or in combination with the first aspect, the multiple slots include a set of slots, and the inter-slot DMRS pattern indicates a subset of slots, from the set of slots, that include at least one DMRS of the one or more DMRSs.

In a third additional aspect, alone or in combination with one or more of the first and second aspects, transmitting the indication of the inter-slot DMRS pattern includes transmitting an RRC message indicating the inter-slot DMRS pattern.

In a fourth additional aspect, alone or in combination with one or more of the first through third aspects, the DMRS configuration and the indication of the inter-slot DMRS pattern are included in the RRC message.

In a fifth additional aspect, alone or in combination with one or more of the first through fourth aspects, transmitting the indication of the inter-slot DMRS pattern includes transmitting a DCI message indicating the inter-slot DMRS pattern.

In a sixth additional aspect, alone or in combination with one or more of the first through fifth aspects, the DCI message schedules the message.

In a seventh additional aspect, alone or in combination with one or more of the first through sixth aspects, the DCI message includes one or more indications that indicate one or more respective slots, of the multiple slots, that include at least one DMRS of the one or more DMRSs.

In an eighth additional aspect, alone or in combination with one or more of the first through seventh aspects, the one or more indications includes a bitmap.

In a ninth additional aspect, alone or in combination with one or more of the first through eighth aspects, a quantity of indications included in the one or more indications is based at least in part on a first quantity of slots that can be scheduled together consecutively or on a second quantity of slots included in the multiple slots.

In a tenth additional aspect, alone or in combination with one or more of the first through ninth aspects, transmitting the indication of the inter-slot DMRS pattern includes transmitting a MAC-CE message indicating the inter-slot DMRS pattern.

In an eleventh additional aspect, alone or in combination with one or more of the first through tenth aspects, the MAC-CE message activates the inter-slot DMRS pattern from a set of inter-slot DMRS patterns.

In a twelfth additional aspect, alone or in combination with one or more of the first through eleventh aspects, process 800 includes transmitting an indication of the set of inter-slot DMRS patterns.

In a thirteenth additional aspect, alone or in combination with one or more of the first through twelfth aspects, the MAC-CE message activates one or more inter-slot DMRS patterns corresponding to respective time domain resource allocation sizes.

In a fourteenth additional aspect, alone or in combination with one or more of the first through thirteenth aspects, process 800 includes receiving a capability message indicating a capability of a UE associated with inter-slot DMRS patterns.

In a fifteenth additional aspect, alone or in combination with one or more of the first through fourteenth aspects, the capability indicates a quantity of slots that can be scheduled consecutively without including any DMRSs in the quantity of slots.

In a sixteenth additional aspect, alone or in combination with one or more of the first through fifteenth aspects, the capability is based at least in part on at least one of an SNR range associated with communications with the network entity, an MCS associated with the communications with the network entity, an SSB periodicity, or a TRS periodicity.

In a seventeenth additional aspect, alone or in combination with one or more of the first through sixteenth aspects, communicating the message includes communicating the message via a sub-THz frequency band.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
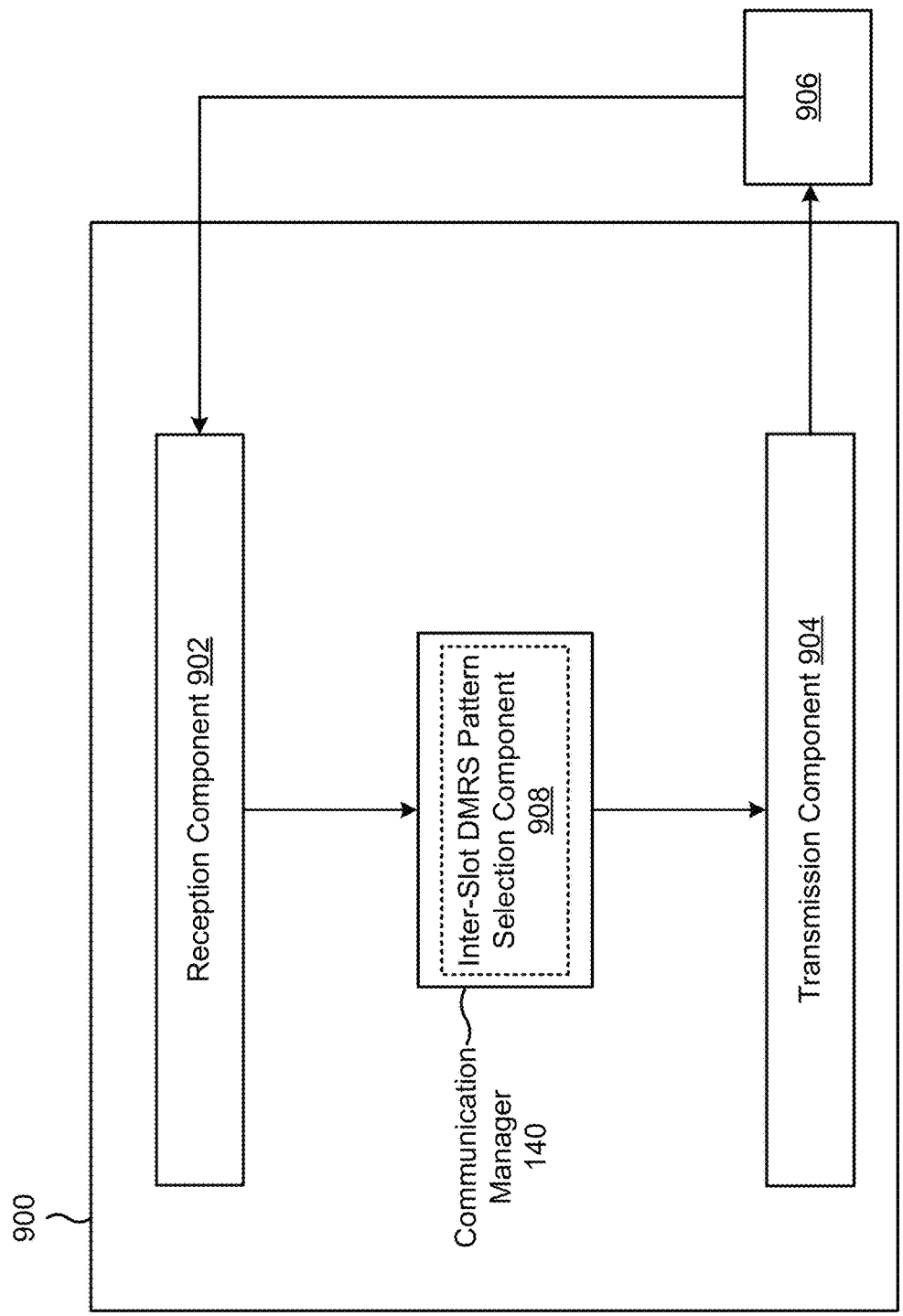
FIG. 9 is a diagram of an example apparatus for wireless communication, in accordance with the present disclosure.

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 6A and 6B. Additionally or alternatively, the apparatus 900 may be configured to perform one or more processes described herein, such as process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication manager 140 may receive or may cause the reception component 902 to receive, from a network entity, a DMRS configuration indicating an intra-slot DMRS pattern. The communication manager 140 may receive or may cause the reception component 902 to receive, from the network entity, an indication of an inter-slot DMRS pattern. The communication manager 140 may communicate or may cause the reception component 902 or the transmission component 904 to communicate, with the network entity, a message that is associated with a time domain resource allocation that includes multiple slots, the message including one or more DMRSs in accordance with the intra-slot DMRS pattern and the inter-slot DMRS pattern. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as an inter-slot DMRS pattern selection component 908, among other examples. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a network entity, a DMRS configuration indicating an intra-slot DMRS pattern. The reception component 902 may receive, from the network entity, an indication of an inter-slot DMRS pattern. The reception component 902 or the transmission component 904 may communicate, with the network entity, a message that is associated with a time domain resource allocation that includes multiple slots, the message including one or more DMRSs in accordance with the intra-slot DMRS pattern and the inter-slot DMRS pattern.

The reception component 902 may receive, from the network entity, an indication of the set of inter-slot DMRS patterns.

The inter-slot DMRS pattern selection component 908 may select the inter-slot DMRS pattern from the one or more inter-slot DMRS patterns based at least in part on a quantity of slots included in the multiple slots.

The transmission component 904 may transmit, to the network entity, a capability message indicating a capability of the UE associated with inter-slot DMRS patterns.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
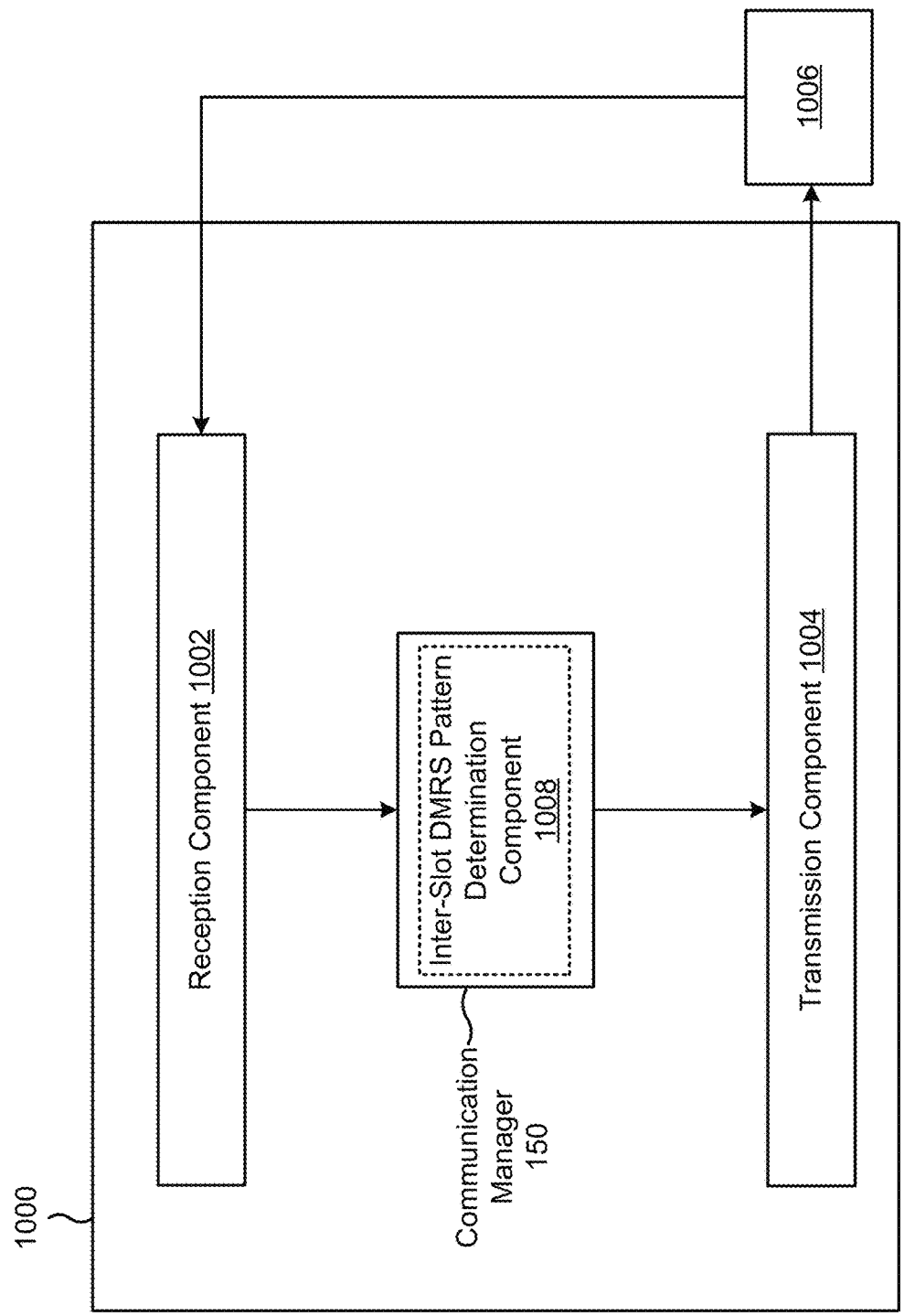
FIG. 10 is a diagram of an example apparatus for wireless communication, in accordance with the present disclosure.

FIG. 10 is a diagram of an example apparatus 1000 for wireless communication in accordance with the present disclosure. The apparatus 1000 may be a network entity, or a network entity may include the apparatus 1000. In some aspects, the apparatus 1000 includes a reception component 1002, a transmission component 1004, and a communication manager 150 (shown in FIGS. 1 and 2 in connection with a base station 110 as an example), which may be in communication with one another (for example, via one or more buses). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 6A and 6B. Additionally or alternatively, the apparatus 1000 may be configured to perform one or more processes described herein, such as process 800 of FIG. 8, or a combination thereof. In some aspects, the apparatus 1000 may include one or more components of the network entity described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the network entity described above in connection with FIG. 2.

The transmission component 1004 may transmit communications, such as reference signals, control information, data communications, or a combination thereof, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described above in connection with FIG. 2. In some aspects, the transmission component 1004 may be co-located with the reception component 1002 in a transceiver.

The communication manager 150 may transmit or may cause the transmission component 1004 to transmit a DMRS configuration indicating an intra-slot DMRS pattern. The communication manager 150 may transmit or may cause the transmission component 1004 to transmit an indication of an inter-slot DMRS pattern. The communication manager 150 may communicate, or may cause the reception component 1002 or the transmission component 1004 to communicate, a message that is associated with a time domain resource allocation that includes multiple slots, the message including one or more DMRSs in accordance with the intra-slot DMRS pattern and the inter-slot DMRS pattern. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network entity described above in connection with FIG. 2. In some aspects, the communication manager 150 includes a set of components, such as an inter-slot DMRS pattern determination component 1008, among other examples. Alternatively, the set of components may be separate and distinct from the communication manager 150. In some aspects, one or more components of the set of components may include or may be implemented within a controller/processor, a memory, a scheduler, a communication unit, or a combination thereof, of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1004 may transmit a DMRS configuration indicating an intra-slot DMRS pattern. The transmission component 1004 may transmit an indication of an inter-slot DMRS pattern. The reception component 1002 or the transmission component 1004 may communicate a message that is associated with a time domain resource allocation that includes multiple slots, the message including one or more DMRSs in accordance with the intra-slot DMRS pattern and the inter-slot DMRS pattern.

The inter-slot DMRS pattern determination component 1008 component may determine the inter-slot DMRS pattern. The inter-slot DMRS pattern determination component 1008 component may determine the inter-slot DMRS pattern based at least in part on a capability of the UE, an SNR, a synchronization reference signal periodicity, a scheduling scenario, or a Doppler parameter, among other examples.

The transmission component 1004 may transmit an indication of a set of inter-slot DMRS patterns.

The reception component 1002 may receive a capability message indicating a capability of a UE associated with inter-slot DMRS patterns.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network entity, a demodulation reference signal (DMRS) configuration indicating an intra-slot DMRS pattern; receiving, from the network entity, an indication of an inter-slot DMRS pattern; and communicating, with the network entity, a message that is associated with a time domain resource allocation that includes multiple slots, the message including one or more DMRSs in accordance with the intra-slot DMRS pattern and the inter-slot DMRS pattern.

Aspect 2: The method of Aspect 1, wherein the intra-slot DMRS pattern indicates one or more time domain locations of a DMRS, of the one or more DMRSs, within a slot of the multiple slots, and wherein the inter-slot DMRS pattern indicates one or more slots, of the multiple slots, that include at least one DMRS of the one or more DMRSs.

Aspect 3: The method of any of Aspects 1-2, wherein the multiple slots include a set of slots, and wherein the inter-slot DMRS pattern indicates a subset of slots, from the set of slots, that include at least one DMRS of the one or more DMRSs.

Aspect 4: The method of any of Aspects 1-3, wherein receiving the indication of the inter-slot DMRS pattern comprises: receiving a radio resource control (RRC) message indicating the inter-slot DMRS pattern.

Aspect 5: The method of Aspect 4, wherein the RRC message indicates a set of inter-slot DMRS patterns corresponding to respective time domain resource allocation sizes, the method further comprising: selecting the inter-slot DMRS pattern from the set of inter-slot DMRS patterns based at least in part on a quantity of slots included in the multiple slots.

Aspect 6: The method of any of Aspects 4-5, wherein the DMRS configuration and the indication of the inter-slot DMRS pattern are included in the RRC message.

Aspect 7: The method of any of Aspects 1-3, wherein receiving the indication of the inter-slot DMRS pattern comprises: receiving a downlink control information (DCI) message indicating the inter-slot DMRS pattern.

Aspect 8: The method of Aspect 7, wherein the DCI message schedules the message.

Aspect 9: The method of any of Aspects 7-8, wherein the DCI message includes one or more indications that indicate one or more respective slots, of the multiple slots, that include at least one DMRS of the one or more DMRSs.

Aspect 10: The method of Aspect 9, wherein the one or more indications includes a bitmap.

Aspect 11: The method of any of Aspects 9-10, wherein a quantity of indications included in the one or more indications is based at least in part on a first quantity of slots that can be scheduled together consecutively or on a second quantity of slots included in the multiple slots.

Aspect 12: The method of any of Aspects 1-3, wherein receiving the indication of the inter-slot DMRS pattern comprises receiving a medium access control (MAC) control element (MAC-CE) message indicating the inter-slot DMRS pattern.

Aspect 13: The method of Aspect 12, wherein the MAC-CE message activates the inter-slot DMRS pattern from a set of inter-slot DMRS patterns.

Aspect 14: The method of Aspect 13, further comprising: receiving, from the network entity, an indication of the set of inter-slot DMRS patterns.

Aspect 15: The method of any of Aspects 12-14, wherein the MAC-CE message activates one or more inter-slot DMRS patterns corresponding to respective time domain resource allocation sizes.

Aspect 16: The method of Aspect 15, further comprising: selecting the inter-slot DMRS pattern from the one or more inter-slot DMRS patterns based at least in part on a quantity of slots included in the multiple slots.

Aspect 17: The method of any of Aspects 1-16, further comprising: transmitting, to the network entity, a capability message indicating a capability of the UE associated with inter-slot DMRS patterns.

Aspect 18: The method of Aspect 17, wherein the capability indicates a quantity of slots that can be scheduled consecutively without including any DMRSs in the quantity of slots.

Aspect 19: The method of any of Aspects 17-18, wherein the capability is based at least in part on at least one of: a signal-to-noise ratio (SNR) range associated with communications with the network entity, a modulation and coding scheme (MCS) associated with the communications with the network entity, a synchronization signal block (SSB) periodicity, or a tracking reference signal (TRS) periodicity.

Aspect 20: The method of any of Aspects 1-19, wherein communicating the message comprises communicating the message via a sub-terahertz (sub-THz) frequency band.

Aspect 21: A method of wireless communication performed by a network entity, comprising: transmitting a demodulation reference signal (DMRS) configuration indicating an intra-slot DMRS pattern; transmitting an indication of an inter-slot DMRS pattern; and communicating a message that is associated with a time domain resource allocation that includes multiple slots, the message including one or more DMRSs in accordance with the intra-slot DMRS pattern and the inter-slot DMRS pattern.

Aspect 22: The method of Aspect 21, wherein the intra-slot DMRS pattern indicates one or more time domain locations of a DMRS, of the one or more DMRSs, within a slot of the multiple slots, and wherein the inter-slot DMRS pattern indicates one or more slots, of the multiple slots, that include at least one DMRS of the one or more DMRSs.

Aspect 23: The method of any of Aspects 21-22, wherein the multiple slots include a set of slots, and wherein the inter-slot DMRS pattern indicates a subset of slots, from the set of slots, that include at least one DMRS of the one or more DMRSs.

Aspect 24: The method of any of Aspects 21-23, wherein transmitting the indication of the inter-slot DMRS pattern comprises: transmitting a radio resource control (RRC) message indicating the inter-slot DMRS pattern.

Aspect 25: The method of Aspect 24, wherein the DMRS configuration and the indication of the inter-slot DMRS pattern are included in the RRC message.

Aspect 26: The method of any of Aspects 21-23, wherein transmitting the indication of the inter-slot DMRS pattern comprises transmitting a downlink control information (DCI) message indicating the inter-slot DMRS pattern.

Aspect 27: The method of Aspect 26, wherein the DCI message schedules the message.

Aspect 28: The method of any of Aspects 26-27, wherein the DCI message includes one or more indications that indicate one or more respective slots, of the multiple slots, that include at least one DMRS of the one or more DMRSs.

Aspect 29: The method of Aspect 28, wherein the one or more indications includes a bitmap.

Aspect 30: The method of any of Aspects 28-29, wherein a quantity of indications included in the one or more indications is based at least in part on a first quantity of slots that can be scheduled together consecutively or on a second quantity of slots included in the multiple slots.

Aspect 31: The method of any of Aspects 21-23, wherein transmitting the indication of the inter-slot DMRS pattern comprises transmitting a medium access control (MAC) control element (MAC-CE) message indicating the inter-slot DMRS pattern.

Aspect 32: The method of Aspect 31, wherein the MAC-CE message activates the inter-slot DMRS pattern from a set of inter-slot DMRS patterns.

Aspect 33: The method of Aspect 32, further comprising: transmitting an indication of the set of inter-slot DMRS patterns.

Aspect 34: The method of any of Aspects 31-33, wherein the MAC-CE message activates one or more inter-slot DMRS patterns corresponding to respective time domain resource allocation sizes.

Aspect 35: The method of any of Aspects 21-34, further comprising: receiving a capability message indicating a capability of a user equipment (UE) associated with inter-slot DMRS patterns.

Aspect 36: The method of Aspect 35, wherein the capability indicates a quantity of slots that can be scheduled consecutively without including any DMRSs in the quantity of slots.

Aspect 37: The method of any of Aspects 35-36, wherein the capability is based at least in part on at least one of: a signal-to-noise ratio (SNR) range associated with communications with the network entity, a modulation and coding scheme (MCS) associated with the communications with the network entity, a synchronization signal block (SSB) periodicity, or a tracking reference signal (TRS) periodicity.

Aspect 38: The method of any of Aspects 21-37, wherein communicating the message comprises communicating the message via a sub-terahertz (sub-THz) frequency band.

Aspect 39: An apparatus for wireless communication at a device, comprising a processor; memory coupled with the processor; and instructions stored in the memory and executable by the processor to cause the apparatus to perform the method of one or more of Aspects 1-20.

Aspect 40: A device for wireless communication, comprising a memory and one or more processors coupled to the memory, the one or more processors configured to perform the method of one or more of Aspects 1-20.

Aspect 41: An apparatus for wireless communication, comprising at least one means for performing the method of one or more of Aspects 1-20.

Aspect 42: A non-transitory computer-readable medium storing code for wireless communication, the code comprising instructions executable by a processor to perform the method of one or more of Aspects 1-20.

Aspect 43: A non-transitory computer-readable medium storing a set of instructions for wireless communication, the set of instructions comprising one or more instructions that, when executed by one or more processors of a device, cause the device to perform the method of one or more of Aspects 1-20.

Aspect 44: An apparatus for wireless communication at a device, comprising a processor; memory coupled with the processor; and instructions stored in the memory and executable by the processor to cause the apparatus to perform the method of one or more of Aspects 21-38.

Aspect 45: A device for wireless communication, comprising a memory and one or more processors coupled to the memory, the one or more processors configured to perform the method of one or more of Aspects 21-38.

Aspect 46: An apparatus for wireless communication, comprising at least one means for performing the method of one or more of Aspects 21-38.

Aspect 47: A non-transitory computer-readable medium storing code for wireless communication, the code comprising instructions executable by a processor to perform the method of one or more of Aspects 21-38.

Aspect 48: A non-transitory computer-readable medium storing a set of instructions for wireless communication, the set of instructions comprising one or more instructions that, when executed by one or more processors of a device, cause the device to perform the method of one or more of Aspects 21-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one processor; and
at least one memory communicatively coupled with the at least one processor and storing processor-readable code that, when executed by the at least one processor, is configured to cause the UE to:
transmit, to a network entity, a capability message indicating a capability of the UE associated with inter-slot demodulation reference signal (DMRS) patterns, wherein the capability of the UE comprises a maximum quantity of slots that can be scheduled consecutively without including any DMRS symbols in the maximum quantity of slots;
receive, from the network entity, a DMRS configuration indicating an intra-slot DMRS pattern;
receive, from the network entity, an indication of an inter-slot DMRS pattern; and
communicate, with the network entity, a message that is associated with a time domain resource allocation that includes multiple slots, the message including one or more DMRSs in accordance with the intra-slot DMRS pattern and the inter-slot DMRS pattern.

2. The UE of claim 1, wherein the intra-slot DMRS pattern indicates one or more time domain locations of a DMRS, of the one or more DMRSs, within a slot of the multiple slots, and wherein the inter-slot DMRS pattern indicates one or more slots, of the multiple slots, that include at least one DMRS of the one or more DMRSs.

3. The UE of claim 1, wherein the multiple slots include a set of slots, and wherein the inter-slot DMRS pattern indicates a subset of slots, from the set of slots, that include at least one DMRS of the one or more DMRSs.

4. The UE of claim 1, wherein, to cause the UE to receive the indication of the inter-slot DMRS pattern, the processor-readable code, when executed by the at least one processor, is configured to cause the UE to:
receive a radio resource control (RRC) message indicating the inter-slot DMRS pattern indicating a set of inter-slot DMRS patterns corresponding to respective time domain resource allocation sizes.

5. The UE of claim 4, wherein the DMRS configuration and the indication of the inter-slot DMRS pattern are included in the RRC message.

6. The UE of claim 1, wherein, to cause the UE to receive the indication of the inter-slot DMRS pattern, the processor-readable code, when executed by the at least one processor, is configured to cause the UE to:
receive a downlink control information (DCI) message indicating the inter-slot DMRS pattern, wherein the DCI message includes one or more indications that indicate one or more respective slots, of the multiple slots, that include at least one DMRS of the one or more DMRSs.

7. The UE of claim 6, wherein the DCI message schedules the message.

8. The UE of claim 6, wherein the one or more indications includes a bitmap.

9. The UE of claim 1, wherein receiving the indication of the inter-slot DMRS pattern comprises receiving a medium access control (MAC) control element (MAC-CE) message indicating the inter-slot DMRS pattern, wherein the MAC-CE message activates the inter-slot DMRS pattern from a set of inter-slot DMRS patterns.

10. The UE of claim 9, wherein the MAC-CE message activates one or more inter-slot DMRS patterns corresponding to respective time domain resource allocation sizes.

11. The UE of claim 1, wherein the capability is based at least in part on at least one of:
a signal-to-noise ratio (SNR) range associated with communications with the network entity,
a modulation and coding scheme (MCS) associated with the communications with the network entity,
a synchronization signal block (SSB) periodicity, or
a tracking reference signal (TRS) periodicity.

12. A network entity for wireless communication, comprising:
at least one processor; and
at least one memory communicatively coupled with the at least one processor and storing processor-readable code that, when executed by the at least one processor, is configured to cause the network entity to:
receive, from a user equipment (UE), a capability message indicating a capability of the UE associated with inter-slot demodulation reference signal (DMRS) patterns, wherein the capability of the UE comprises a maximum quantity of slots that can be scheduled consecutively without including any DMRS symbols in the maximum quantity of slots;
transmit a DMRS configuration indicating an intra-slot DMRS pattern;
transmit an indication of an inter-slot DMRS pattern; and
communicate a message that is associated with a time domain resource allocation that includes multiple slots, the message including one or more DMRSs in accordance with the intra-slot DMRS pattern and the inter-slot DMRS pattern.

13. The network entity of claim 12, wherein the intra-slot DMRS pattern indicates one or more time domain locations of a DMRS, of the one or more DMRSs, within a slot of the multiple slots, and wherein the inter-slot DMRS pattern indicates one or more slots, of the multiple slots, that include at least one DMRS of the one or more DMRSs.

14. A method of wireless communication performed by a user equipment (UE), comprising:
transmitting, to a network entity, a capability message indicating a capability of the UE associated with inter-slot demodulation reference signal (DMRS) patterns, wherein the capability of the UE comprises a maximum quantity of slots that can be scheduled consecutively without including any DMRS symbols in the maximum quantity of slots;
receiving, from the network entity, a DMRS configuration indicating an intra-slot DMRS pattern;
receiving, from the network entity, an indication of an inter-slot DMRS pattern; and
communicating, with the network entity, a message that is associated with a time domain resource allocation that includes multiple slots, the message including one or more DMRSs in accordance with the intra-slot DMRS pattern and the inter-slot DMRS pattern.

15. The method of claim 14, wherein the intra-slot DMRS pattern indicates one or more time domain locations of a DMRS, of the one or more DMRSs, within a slot of the multiple slots, and wherein the inter-slot DMRS pattern indicates one or more slots, of the multiple slots, that include at least one DMRS of the one or more DMRSs.

16. The method of claim 14, wherein the multiple slots include a set of slots, and wherein the inter-slot DMRS pattern indicates a subset of slots, from the set of slots, that include at least one DMRS of the one or more DMRSs.

17. The method of claim 14, wherein receiving the indication of the inter-slot DMRS pattern comprises:
receiving a radio resource control (RRC) message indicating the inter-slot DMRS pattern indicating a set of inter-slot DMRS patterns corresponding to respective time domain resource allocation sizes.

18. The method of claim 17, wherein the DMRS configuration and the indication of the inter-slot DMRS pattern are included in the RRC message.

19. The method of claim 14, wherein receiving the indication of the inter-slot DMRS pattern comprises:
receiving a downlink control information (DCI) message indicating the inter-slot DMRS pattern, wherein the DCI message includes one or more indications that indicate one or more respective slots, of the multiple slots, that include at least one DMRS of the one or more DMRSs.

20. The method of claim 19, wherein the DCI message schedules the message.

21. The method of claim 19, wherein the one or more indications includes a bitmap.

22. The method of claim 14, wherein receiving the indication of the inter-slot DMRS pattern comprises receiving a medium access control (MAC) control element (MAC-CE) message indicating the inter-slot DMRS pattern, wherein the MAC-CE message activates the inter-slot DMRS pattern from a set of inter-slot DMRS patterns.

23. The method of claim 22, wherein the MAC-CE message activates one or more inter-slot DMRS patterns corresponding to respective time domain resource allocation sizes.

24. The method of claim 14, wherein the capability is based at least in part on at least one of:
a signal-to-noise ratio (SNR) range associated with communications with the network entity,
a modulation and coding scheme (MCS) associated with the communications with the network entity,
a synchronization signal block (SSB) periodicity, or
a tracking reference signal (TRS) periodicity.

25. A method of wireless communication performed by a network entity, comprising:
receiving, from a user equipment (UE), a capability message indicating a capability of the UE associated with inter-slot demodulation reference signal (DMRS) patterns, wherein the capability of the UE comprises a maximum quantity of slots that can be scheduled consecutively without including any DMRS symbols in the maximum quantity of slots;
transmitting a DMRS configuration indicating an intra-slot DMRS pattern;
transmitting an indication of an inter-slot DMRS pattern; and
communicating a message that is associated with a time domain resource allocation that includes multiple slots, the message including one or more DMRSs in accordance with the intra-slot DMRS pattern and the inter-slot DMRS pattern.

26. The method of claim 25, wherein the intra-slot DMRS pattern indicates one or more time domain locations of a DMRS, of the one or more DMRSs, within a slot of the multiple slots, and wherein the inter-slot DMRS pattern indicates one or more slots, of the multiple slots, that include at least one DMRS of the one or more DMRSs.

27. The network entity of claim 12, wherein the multiple slots include a set of slots, and wherein the inter-slot DMRS pattern indicates a subset of slots, from the set of slots, that include at least one DMRS of the one or more DMRSs.

28. The network entity of claim 12, wherein to cause the network entity to transmit the indication of the inter-slot DMRS pattern, the processor-readable code, when executed by the at least one processor, is configured to cause the network entity to:
transmit a radio resource control (RRC) message indicating the inter-slot DMRS pattern indicating a set of inter-slot DMRS patterns corresponding to respective time domain resource allocation sizes.

29. The network entity of claim 28, wherein the DMRS configuration and the indication of the inter-slot DMRS pattern are included in the RRC message.

30. The network entity of claim 12, wherein to cause the network entity to transmit the indication of the inter-slot DMRS pattern, the processor-readable code, when executed by the at least one processor is configured to cause the network entity to:
transmit a downlink control information (DCI) message indicating the inter-slot DMRS pattern, wherein the DCI message includes one or more indications that indicate one or more respective slots, of the multiple slots, that include at least one DMRS of the one or more DMRSs.

* * * * *